United States Patent
Jehamy

(10) Patent No.: US 10,048,362 B2
(45) Date of Patent: Aug. 14, 2018

(54) ROTORCRAFT FITTED WITH A RADIOALTIMETER HAVING PLANE ANTENNAS AND A LENS FOR MODIFYING THE FIELD OF VIEW OF THE ANTENNAS

(71) Applicant: AIRBUS HELICOPTERS, Marignane (FR)

(72) Inventor: Eddy Jehamy, Chateauneuf les Martigues (FR)

(73) Assignee: Airbus Helicopters, Marignane (FR)

( * ) Notice: Subject to any disclaimer, the term of this patent is extended or adjusted under 35 U.S.C. 154(b) by 413 days.

(21) Appl. No.: 14/873,389

(22) Filed: Oct. 2, 2015

(65) Prior Publication Data
US 2016/0097848 A1    Apr. 7, 2016

(30) Foreign Application Priority Data

Oct. 3, 2014 (FR) .................. 14 02246

(51) Int. Cl.
*G01S 13/08* (2006.01)
*G01S 7/03* (2006.01)
(Continued)

(52) U.S. Cl.
CPC .......... *G01S 13/08* (2013.01); *G01S 7/03* (2013.01); *G01S 13/882* (2013.01); *H01Q 1/28* (2013.01);
(Continued)

(58) Field of Classification Search
CPC ...... G01S 13/882; H01Q 15/02; H01Q 19/06; H01Q 19/062
See application file for complete search history.

(56) References Cited

U.S. PATENT DOCUMENTS 3,088,109 A    4/1963   Meyer
4,489,328 A *  12/1984  Gears ............... H01Q 1/38
                                              343/700 MS
(Continued)

FOREIGN PATENT DOCUMENTS

EP    1933163       6/2008
JP    H10268039     10/1998
(Continued)

OTHER PUBLICATIONS

French Search Report for French Application No. FR 1402246, Completed by the French Patent Office dated Jun. 26, 2015, 6 Pages.
(Continued)

*Primary Examiner* — Peter M Bythrow
(74) *Attorney, Agent, or Firm* — Brooks Kushman P.C.

(57) ABSTRACT

A method of measuring the height of a rotorcraft above the ground by means of a radioaltimeter having plane antennas, and it also provides to such a radioaltimeter and a rotorcraft fitted with such a radioaltimeter. The rotorcraft is provided with sling equipment for transporting a load swinging under the rotorcraft in a given field of mobility, and a lens modifies the basic field of view of the radioaltimeter as supplied by the antennas between firstly a limited field of view for the radioaltimeter excluding the field of mobility of the load transported by the sling equipment from the field of view of the radioaltimeter, and secondly an optimum field of view of the radioaltimeter of scope that is optimized in the event that no load is being transported by the sling equipment.

39 Claims, 6 Drawing Sheets

(51) Int. Cl.
  *G01S 13/88* (2006.01)
  *H01Q 3/14* (2006.01)
  *H01Q 1/28* (2006.01)
  *H01Q 1/42* (2006.01)
  *G01S 7/02* (2006.01)

(52) U.S. Cl.
  CPC ............... *H01Q 1/42* (2013.01); *H01Q 3/14* (2013.01); *G01S 2007/027* (2013.01)

(56) References Cited

U.S. PATENT DOCUMENTS

| | | | |
|---|---|---|---|
| 6,434,085 B1* | 8/2002 | Nedwell | G01S 15/06 367/100 |
| 6,452,567 B1 | 9/2002 | Overton | |
| 6,583,733 B2* | 6/2003 | Ishihara | B64D 45/04 340/946 |
| 6,980,153 B2* | 12/2005 | Hager | G01C 5/00 342/120 |
| 7,030,834 B2 | 4/2006 | Delgado et al. | |
| 7,088,308 B2 | 8/2006 | Delgado et al. | |
| 7,898,435 B2* | 3/2011 | Rogers | G01C 5/005 340/973 |
| 2003/0030582 A1* | 2/2003 | Vickers | G01S 17/023 342/54 |
| 2005/0253750 A1* | 11/2005 | Hager | G01C 5/00 342/120 |
| 2009/0213019 A1 | 8/2009 | Schoebel | |
| 2013/0214963 A1* | 8/2013 | Vacanti | G01S 7/038 342/120 |
| 2017/0001732 A1* | 1/2017 | Lim | G05D 1/0684 |
| 2017/0010350 A1* | 1/2017 | Winstead | G01S 13/882 |

FOREIGN PATENT DOCUMENTS

| | | |
|---|---|---|
| JP | 3755225 | 3/2006 |
| WO | 2007009834 | 1/2007 |
| WO | 2007118211 | 10/2007 |

OTHER PUBLICATIONS

Nonnenmacher et al. CEAS Aeromaut J. published online on Dec. 10, 2013, vol. 5, No. 2, p. 127-143, "System architecture of HALAS—a helicopter slung load stabilisation and positioning system".

* cited by examiner

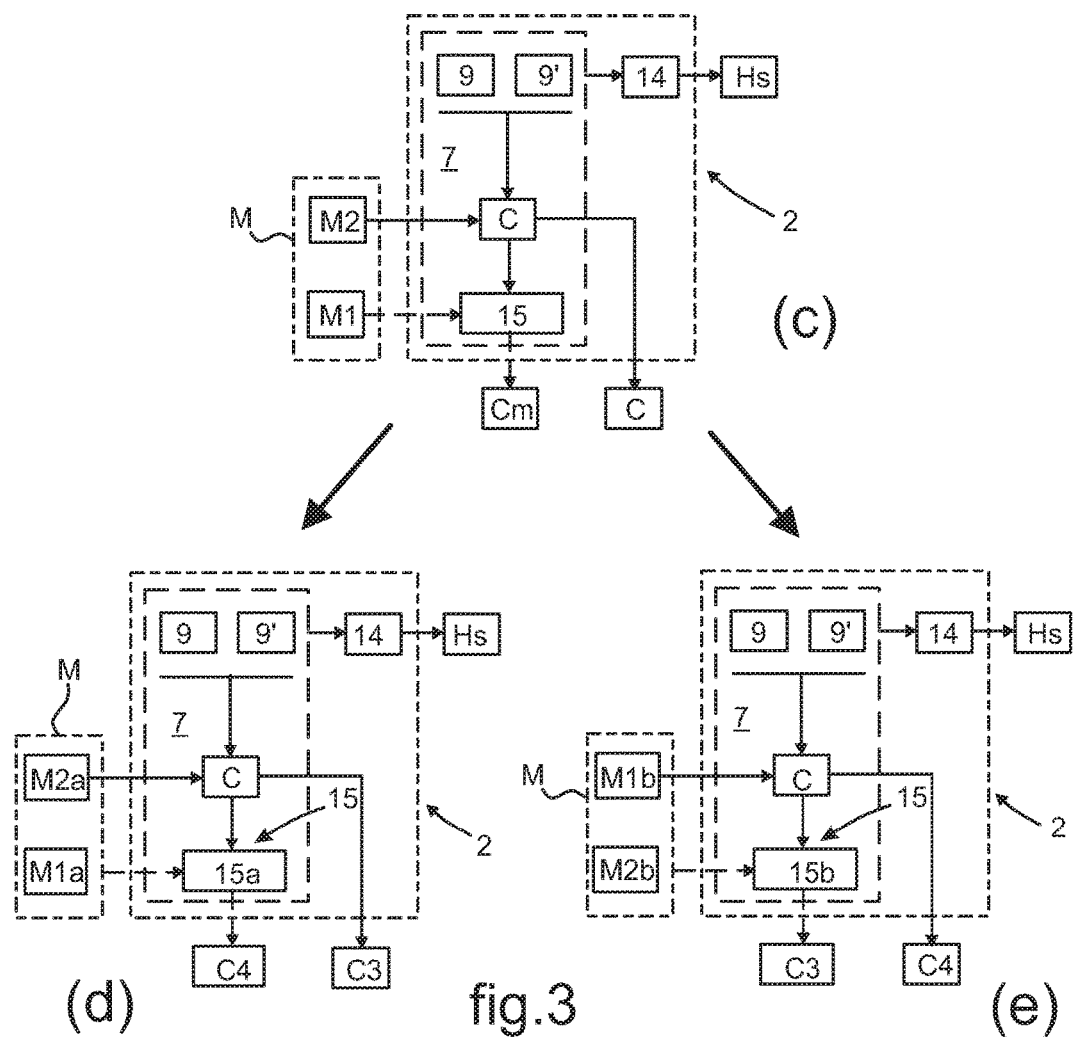
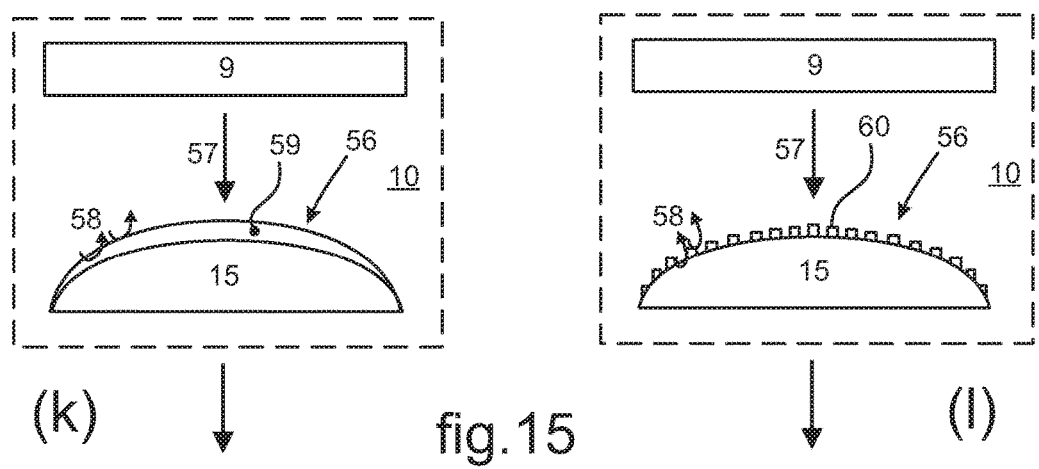
fig. 3
fig. 15

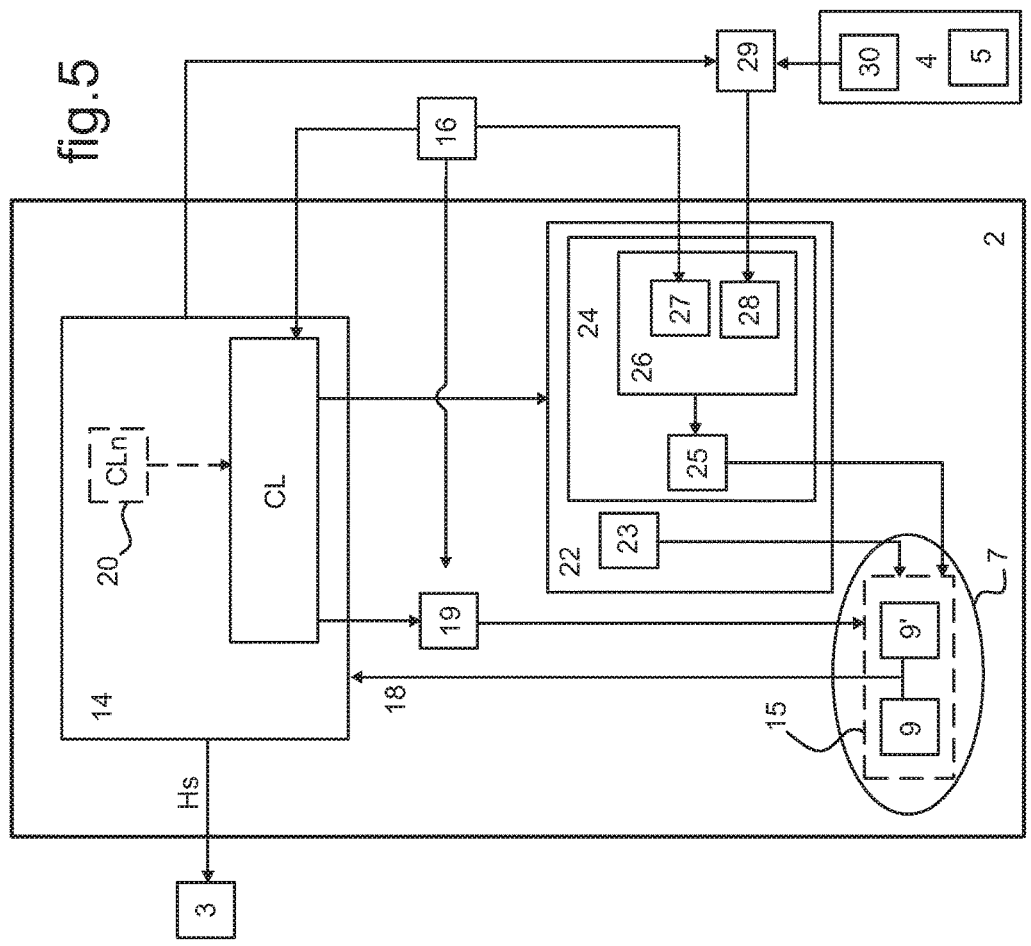
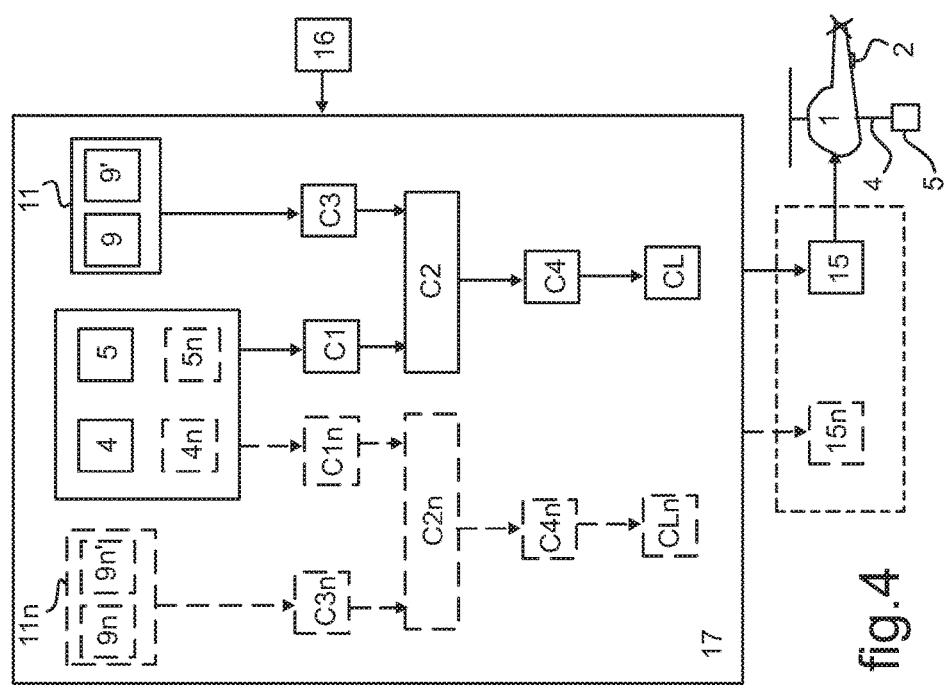

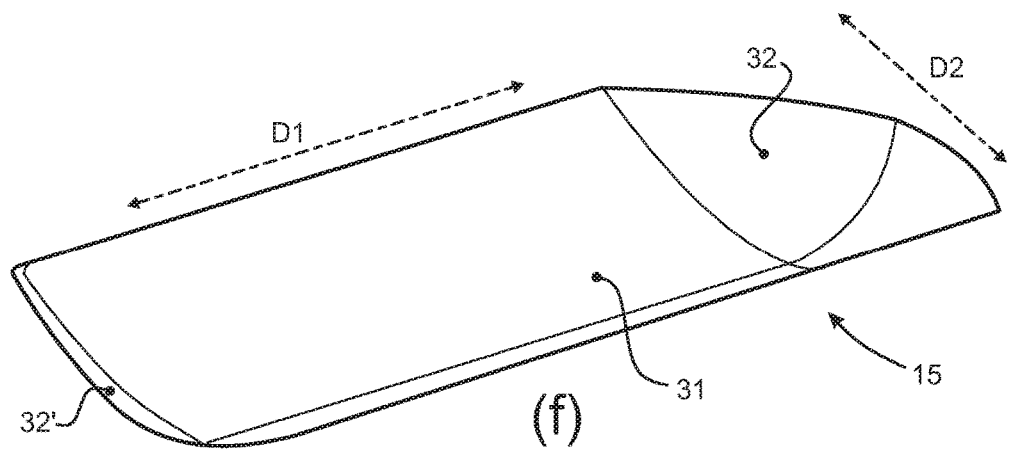
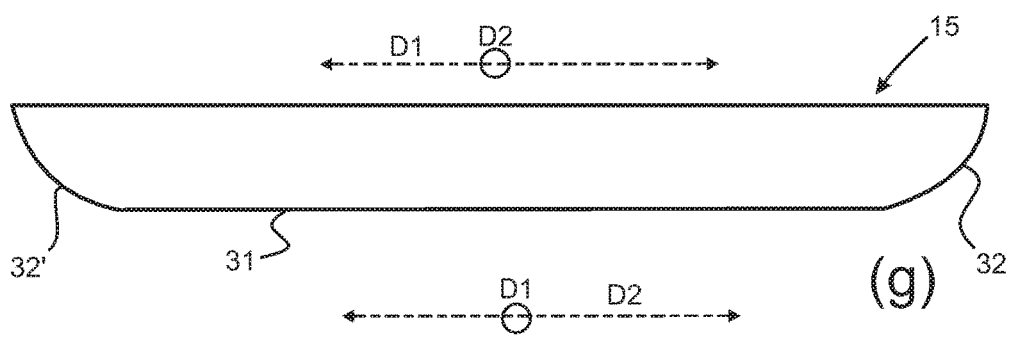
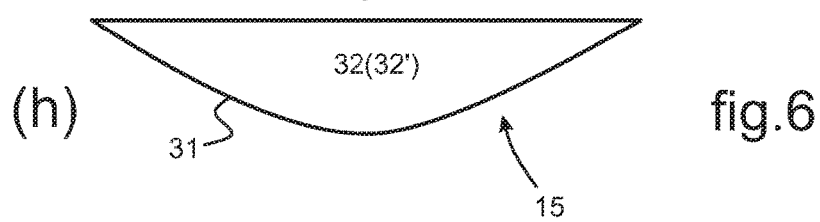
fig.6
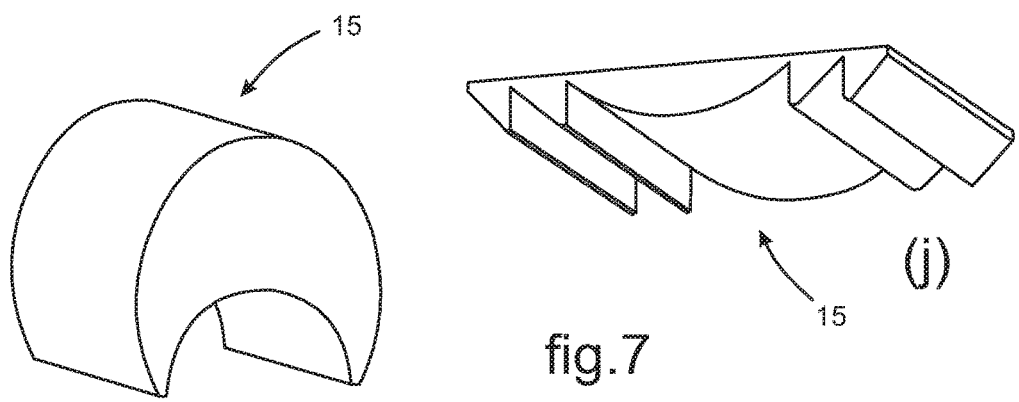
fig.7

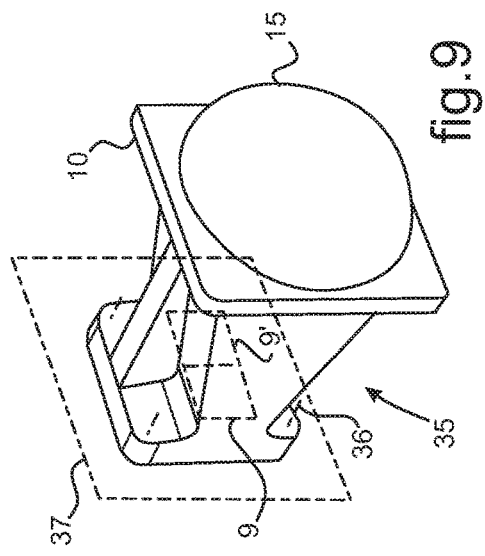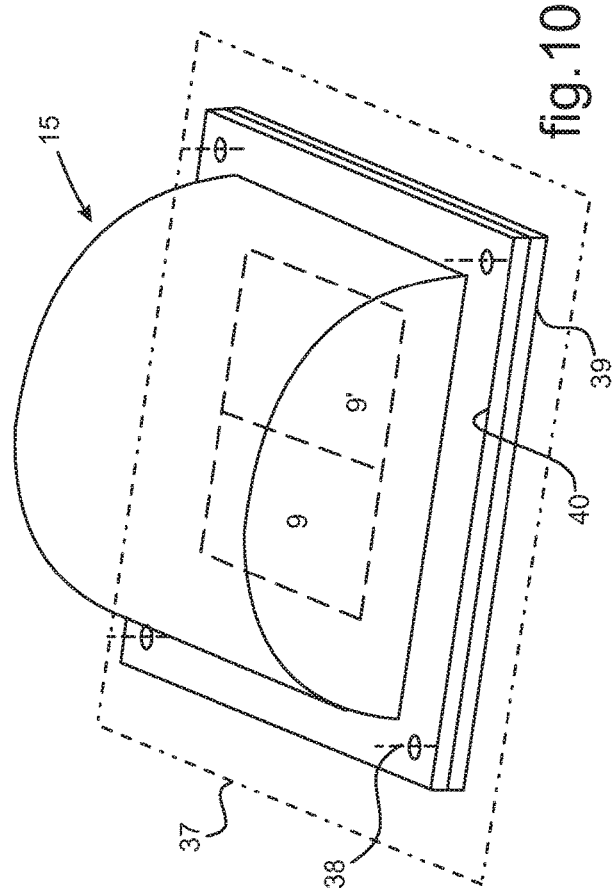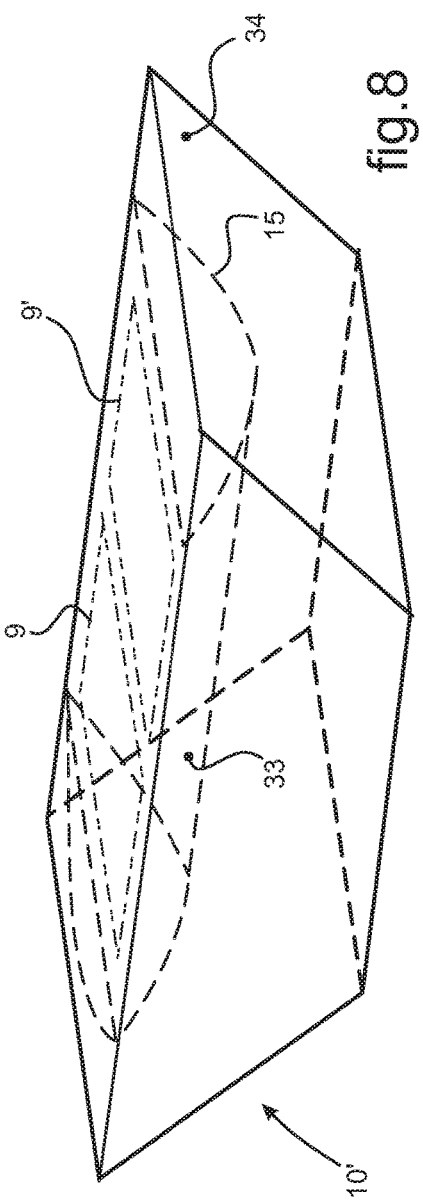

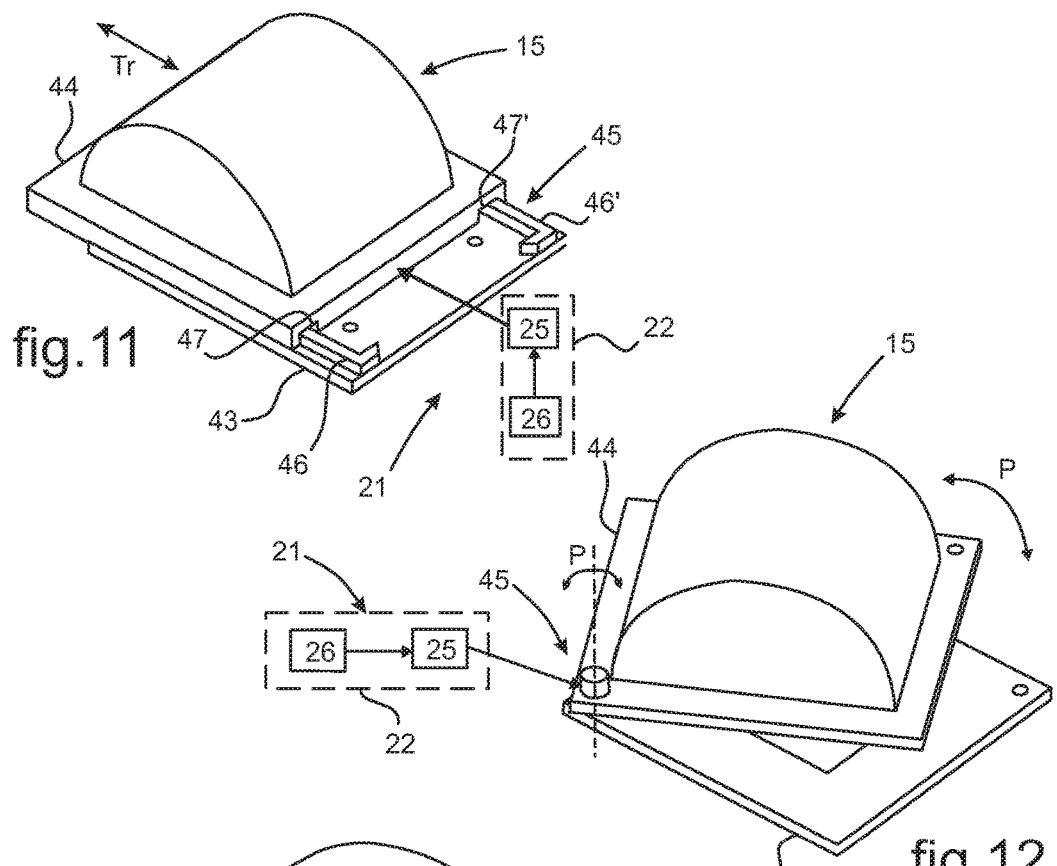
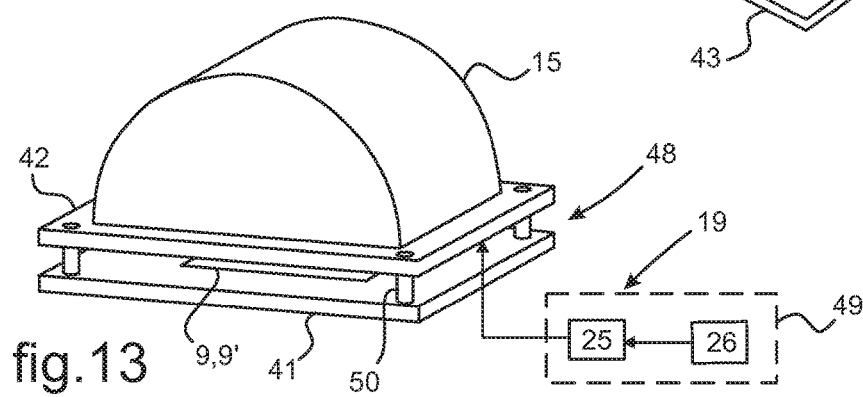
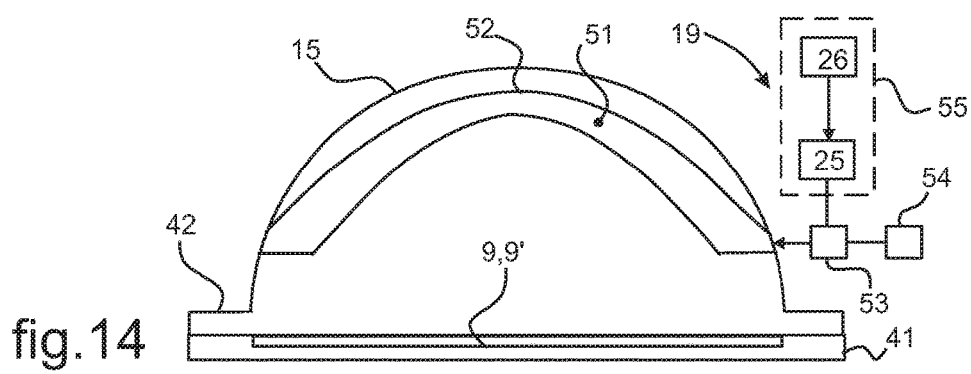

ROTORCRAFT FITTED WITH A RADIOALTIMETER HAVING PLANE ANTENNAS AND A LENS FOR MODIFYING THE FIELD OF VIEW OF THE ANTENNAS

CROSS REFERENCE TO RELATED APPLICATION

This application claims priority to French patent application No. of FR 14 02246 filed on Oct. 3, 2014, the disclosure of which is incorporated in its entirety by reference herein.

BACKGROUND OF THE INVENTION (1) Field of the Invention

The present invention relates to the field of rotorcraft, and it relates more particularly to arrangements associated with the antennas of radioaltimeters fitted to rotorcraft.

(2) Description of Related Art

Rotorcraft are conventionally fitted with a radioaltimeter providing data about the height of the rotorcraft above the ground. A radioaltimeter uses a pair of antennas, including a transmit antenna transmitting a radio signal as pulses or continuously, and a receive antenna picking up said radio signal after it has been reflected on the ground.

The height of the rotorcraft above the ground is determined by a computer of the radioaltimeter by taking the time that elapses between the transmit antenna transmitting the radio signal and the receive antenna receiving the radio signal, and dividing the time by the propagation speed of an electromagnetic wave in air.

Radioaltimeter antennas are positioned on board a rotorcraft so as to avoid the radio signal being reflected against the structure of the helicopter. That is why it is conventional practice for the antennas to be installed on the underside of the rotorcraft, with the underside location of the antennas under the rotorcraft naturally being as considered relative to the position of the rotorcraft when on the ground. Furthermore, the antennas of the radioaltimeter are commonly protected from the outside environment of the rotorcraft, in particular from bad weather, by a radome that is typically arranged as a cupola that is transparent to radiowaves.

Nevertheless, rotorcraft are sometimes used for specific flight missions that involve transporting a slung load. In this context, there arises the problem of potential interference between the load being transported by sling and the radio signals exchanged between the antennas of the radioaltimeter.

The load being transported by sling swings under the rotorcraft, thereby making it possible while the rotorcraft is in motion, for the load to intrude into the radioaltimeter's field of view as defined by the antennas. In this context, such an intrusion runs the risk of the radio signals that are being exchanged between the antennas being reflected on the load instead of on the ground, and consequently making the pertinence of the height supplied by the radioaltimeter doubtful.

Such a risk of the load intruding into the field of view of the antennas increases when the location of the antennas on board the rotorcraft is at a short distance from the sling equipment, as happens in particular with a rotorcraft of moderate size.

Such a risk of the load intruding into the field of view of the antennas has been known for a long time, and one solution that is conventionally used for avoiding any risk of interference between the load being transported by sling and the radio signals exchanged between the antennas consists in installing "horn" antennas on board the rotorcraft so as to define a narrow field of view for the radioaltimeter.

Nevertheless, such a solution is not satisfactory, since the ability to measure the height of the rotorcraft above the ground becomes limited when the rotorcraft is performing turns that are strongly banked, in particular in roll, and/or when the rotorcraft is overflying terrain that presents relief that is complex and varied.

Consequently, given the occasional nature of rotorcraft performing flight missions that involve transporting a slung load, it is conventional to mount antennas on board rotorcraft that are of plane configuration so as to obtain an optimized field of view for the radioaltimeter. Such provisions make it possible in particular to provide the pilot of the rotorcraft with reliable information about the height of the rotorcraft above the ground for most flight missions of a rotorcraft, except when transporting a slung load.

Consequently, the plane antennas of the radioaltimeter advantageously identify an optimized field of view for the radioaltimeter, the radioaltimeter commonly being taken out of operation by the crew of the rotorcraft when transporting a slung load.

Another solution consists in replacing the antennas of the radioaltimeter from a set of interchangeable antennas, depending on the flight mission of the rotorcraft. Nevertheless, such operations are expensive and difficult to perform, and in practice they are little used.

In the general field of transport, numerous solutions have been proposed for mounting radio antennas on a movable structure so as to present a field of view that is adapted to requirements, in particular by adjusting the direction in which the antennas point or by special arrangements for the radome. By way of example, reference may be made to the following documents: U.S. Pat. No. 6,452,567 (Harris Broadband Wireless Access, Inc.); U.S. Pat. No. 7,030,834 (Harris Corp.); U.S. Pat. No. 7,088,308 (Harris Corp.); EP 1 907 882 (Robert Bosch GmbH); and WO 2007/118211 (Andrew Corp.).

Document US 2005/253750 (Honeywell International, Inc.) describes a radar altimeter for a vehicle operating with a suspended load. In order to maintain a desired altitude in flight while not moving forwards, a vehicle such as a helicopter needs to detect an accurate altitude above the level ground (AGL). The radar altimeter delivers radiofrequency (RF) pulses at regular intervals to an antenna that transmits beams to the ground. The beams are then reflected and picked up by an antenna of the radar altimeter. Load profile processing limits the altitude sensitivity for certain distances between the radar altimeter and the suspended load so as to reduce the risk of processing signals reflected by the suspended load. The radar altimeter distinguishes between radar reflections coming from the suspended load and reflections coming from the ground on the basis of these reflections having distinct signatures. Logic gates for tracking altitude and for acquiring altitude act as logic switches that enable only certain examples of reflections to be processed.

Document XP 035317934 entitled: "System architecture of HALAS-a helicopter slung load stabilization and positioning system", by D. Nonnenmacher et al., was published by Deutsches Zentrum für Luft and Raumfahrt, Germany, on Dec. 10, 2013. That document mentions varying the altitude of a helicopter for indirectly damping pendular movements of a load suspended under the helicopter.

Document U.S. Pat. No. 3,088,109 (Lab for Electronics, Inc.) describes a Doppler navigation radar for accurately specifying the speed components of a helicopter, including while hovering. The energy returned by various transmit beams is received separately and the respective frequency spectra are converted into a frequency spectrum scope close to a tracking frequency.

Document EP 1 933 163 (Franco Baldi) describes detecting an obstacle by aiming and focusing transmitted waves, for various types of moving body including cars, trains, floating vessels, aircraft, missiles, or automatic aiming systems. The power of the signals transmitted or received by an obstacle detector is amplified. Obstacle detection makes provisions for various antenna output lens shapes and for the possibility of discriminating in different directions. Various lens shapes are described.

Document JP 3 755 225 (Kokusai Electric Co. Ltd.) describes a radioaltimeter mounted on a helicopter. In order to avoid zero correction of an altimeter measurement, a time interval is taken into account between transmitting and receiving waves.

BRIEF SUMMARY OF THE INVENTION

In the above-mentioned specific context of rotorcraft, an object of the present invention is to provide a method of measuring the height of a rotorcraft above the ground by means of a radioaltimeter having radio antennas of plane configuration that provide an optimized field of view.

The present invention seeks more particularly to propose such a method that makes it possible to determine reliably the height of the rotorcraft above the ground in the context of occasional flight missions involving transporting a slung load, but without that affecting the optimization of the field of view of radio antennas of the radioaltimeter when the rotorcraft is operating in conditions other than transporting a slung load.

The present invention also provides a radioaltimeter for a rotorcraft having radio antennas of plane configuration, suitable for performing such a method, and it also provides a rotorcraft fitted with such a radioaltimeter.

The method of the present invention is a method of measuring the height of a rotorcraft above the ground by means of a radioaltimeter using a computer for determining said height of the rotorcraft above the ground on the basis of data supplied by radio apparatus having at least one set of two antennas protected by at least one radome. The antennas are conventionally of plane configuration and they are installed on the underside of the rotorcraft, as considered when it is standing on the ground. Between them, the antennas typically predefine a "basic" field of view of the radioaltimeter and they supply said data to the computer as a result of exchanging electromagnetic signals between each other.

In the present invention, consideration is taken of the fact that the rotorcraft also has sling equipment for transporting a load.

In this context, the present invention comprises an operation of modifying said basic field of view of the radioaltimeter by at least one lens as a function of whether a given load that is to be transported swinging under the rotorcraft by said sling equipment will or will not interfere in the basic field of view of the radioaltimeter. Said at least one lens is used selectively depending on whether the field of mobility of the load modifies the basic field of view of the radioaltimeter, as follows:

in the event of the sling equipment not transporting a load, then the radioaltimeter produces a field of view having a predefined optimum scope, referred to as the optimum field of view; and in the event of the sling equipment transporting a load, then the radioaltimeter produces a "limited" field of view of scope smaller than the scope of the optimum field of view. The limited field of view is identified by excluding from the optimum field of view a previously determined field of mobility of said load transported by the sling equipment, said field of mobility being considered at least along the longitudinally-extending axis of the rotorcraft.

Should it be necessary, it is specified that the field of mobility of the load, as defined by a cone, which by way of indication may be a 60°±10° cone, can easily be identified by various criteria, including in particular:

the arrangement and the position on board the rotorcraft of the sling equipment, in particular taking account of the length of the load-carrying sling and of its position on board the rotorcraft;

the characteristics of the transported load, taking into account in particular of its volume, its weight, and/or its shape;

the characteristics of the rotorcraft relative to its ability to advance during a flight mission involving transporting a slung load, in particular taking account of its forward speed and its angles of inclination in pitching and in roll;

or indeed atmospheric conditions.

Should it be necessary, it is also specified that the interference field can easily be identified firstly from the field of mobility of the load and the characteristics of the optimum field of view of the radioaltimeter, commonly identified by way of example as a 140°±25° cone, depending on the arrangement of the rotorcraft, and secondly from the relative position on board the rotorcraft between the radio apparatus and the sling equipment.

Also should it be necessary, it is specified that the concepts of longitudinally-extending and transversely-extending axes of the rotorcraft are relative concepts conventionally defined relative to the orientation of the rotorcraft as taken into consideration when standing on the ground. The rotorcraft extends longitudinally between its front and its rear, and it extends transversely between its sides.

It can be seen from the provisions of the invention that when the rotorcraft is flying in a flight mission that involves transporting a slung load, optimally restricting the field of view normally used when not transporting a slung load serves to prevent interference between the transported load and the radio signals exchanged between the antennas. The field of view of the radioaltimeter is optimally restricted at least along the longitudinally-extending axis of the rotorcraft so as to take into consideration at least the movements of the load towards the tail of the rotorcraft where the radio apparatus is commonly installed, such as for example under a tail boom as is commonly fitted to a rotorcraft.

In the context of the present invention, it should be understood that the lens may either be a converging lens or else a diverging lens, depending on the scope of the basic field of view of the radioaltimeter. Naturally, as is typical in the field of optics, said optimum field of view and said limited field of view are produced respectively by using or not using the optical characteristics specific to such converging or diverging lenses for modifying the basic field of view of the radioaltimeter.

For example, in one embodiment, the basic field of view of the radioaltimeter may have a scope equivalent to the optimum field of view. Under such circumstances, the lens is a converging lens for focusing the basic field of view of the radioaltimeter so as to produce the limited field of view, the optimum field of view being produced by neutralizing the effects of the lens on the basic field of view of the radioaltimeter, e.g. as mentioned below, by retracting the lens out from the basic field of view of the radioaltimeter, and/or by removing the lens from the radio apparatus.

Also by way of example, and conversely, in another embodiment, the basic field of view of the radioaltimeter may be of a scope equivalent to the limited field of view. Under such circumstances, the lens is a diverging lens for enlarging the basic field of view of the radioaltimeter in order to produce the optimum field of view, the limited field of view being produced by neutralizing the effects of the lens on the basic field of view of the radioaltimeter, e.g., as described below, by retracting the lens out from the basic field of view of the radioaltimeter and/or by removing the lens from the radio apparatus.

More particularly, when the lens is formed by a converging lens, the method comprises both an operation of the converging lens focusing the basic field of view of the radioaltimeter depending on the previous identified field of mobility of the load, thereby causing the radioaltimeter to have the limited field of view; and an operation of neutralizing the effects produced by the converging lens on the basic field of view of the radioaltimeter thereby causing the radioaltimeter to have the optimum field of view.

Also more particularly, when the lens is formed by a diverging lens, the method comprises both an operation of the diverging lens enlarging the basic field of view of the radioaltimeter thereby causing the radioaltimeter to have the optimum field of view; and an operation neutralizing the effects produced by the diverging lens on the basic field of view of the radioaltimeter thereby causing the radioaltimeter to have the limited field of view.

The method of the present invention comprises in particular the operations mentioned below.

During a first step, an operator identifies a field of mobility of at least one said given load that is to be transported swinging under the rotorcraft by said sling equipment, with this being done in particular by calculation prior to the rotorcraft taking off. Thereafter, the operator determines an "interference" field that is identified by intersection between the optimum field of view and the field of mobility of said given load. Thereafter, the operator deduces the limited field of view by excluding the interference field from the optimum field of view, the interference field being considered at least along the longitudinally-extending axis of the rotorcraft, and possibly also along the transversely-extending axis of the rotorcraft, as specified below.

Thereafter, during a second step, and still in particular by calculation performed before the rotorcraft takes off, the operator identifies an optical configuration, or in other words the optical characteristics, for at least one lens suitable for modifying the basic field of view of the radioaltimeter as follows:

either by using a converging lens to reduce the basic field of view of the radioaltimeter to said limited field of view in the event of the basic field of view of the radioaltimeter being equivalent to the optimum field of view;

or else, by using a diverging lens to increase the basic field of view of the radioaltimeter to said predefined optimum field of view when the basic field of view of the radioaltimeter is equivalent to the limited field of view of the radioaltimeter.

Then, during a first step, the lens is selectively installed on the radio apparatus so as to be used depending on requirements. More particularly, said at least one lens of previously identified optical configuration is selectively used or not used depending on the field of view to be imparted to the radioaltimeter as selected from the optimum field of view and from the limited field of view, corresponding respectively to not transporting or to transporting a given load by means of the sling equipment.

It can be understood that the lens may potentially be installed or not installed on the radio apparatus by an operator in a workshop in order to fit the radio apparatus with said at least one lens prior to installing the radio apparatus on board the rotorcraft, or indeed installation may potentially be performed by selectively mounting the lens on board the rotorcraft before it takes off.

It should be observed that it is preferable to give the radioaltimeter the limited field of view that takes account of the field of mobility of the load solely along the longitudinally-extending axis of the rotorcraft. A swinging load transported by sling moves essentially towards the rear of the rotorcraft as the rotorcraft moves forwards, with the rotorcraft generally flying with a stabilized attitude while transporting a slung load, avoiding flight maneuvers of the type involving a banked turn.

In this context, it is decided to optimize the extent of the optimal field of view imparted to the radioaltimeter when the rotorcraft is performing a turn while not transporting a load with the sling equipment. When a rotorcraft is putting down the transported load or when it is traveling to a site for taking a load from the ground, it is preferable to optimize the field of view of the radioaltimeter, at least relative to the roll axis.

Nevertheless, the limited field of view may be obtained not only along the longitudinally-extending axis of the rotorcraft, but also along the transversely-extending axis of the rotorcraft, possibly for the purpose of taking account of potential transverse movements of the load relative to the rotorcraft, in particular under the effect of the rotorcraft turning.

Thus, in a particular aspect of the method of the present invention, said limited field of view is deduced by excluding from the optimum field of view said interference field as considered both along the longitudinally-extending axis of the rotorcraft and along the transversely-extending axis of the rotorcraft.

It is then advantageous to vary the reduction in the optimum field of view of the radioaltimeter selectively not only in terms of whether or not a load is being transported by sling, but also depending on various potential fields of mobility of different loads that might potentially be transported by the sling equipment, including while possibly taking account of specific ways in which a given load can be transported by the sling equipment.

The field of mobility of a load transported by sling frequently varies depending on the transported load and/or depending on the ways in which the load is installed on the sling equipment, or indeed depending on the particular arrangement of the sling equipment, such as for example taking account of variation in the length of the sling used. In this context, it is advantageous to adapt the production of the optimum field of view so that it depends on the particular way in which the load is transported by sling in a given flight mission of the rotorcraft.

For this purpose, the present invention proposes potentially identifying a plurality of configurations for reducing the optimum field of view, corresponding to a plurality of respective potential fields of mobility of a load that can be transported by the rotorcraft, in order to limit the optimum field of view in a manner that is specific to requirements. Such requirements should naturally be understood as being identified for a given flight of the rotorcraft, while taking account of the field of mobility specific to a given load being transported by sling under the rotorcraft in compliance with predefined ways of transporting a slung load.

More particularly, the operations performed in accordance with the method of the present invention comprise the provisions specified below.

A plurality of fields of mobility are identified respectively for each of a plurality of given loads, and consequently a plurality of said limited fields of view are deduced respectively for each of said previously identified plurality of fields of mobility. Consequently, a plurality of optical configurations of said at least one lens are identified depending respectively on said plurality of limited fields of view. Said at least one lens of optical configuration previously identified for a particular load under consideration that is to be transported is used in order to impart to the radioaltimeter the limited field of view as deduced from the field of mobility of the load under consideration for transporting by the sling equipment.

In this context, various solutions are proposed for installing on board the rotorcraft at least one lens that is suitable for reducing the optimum field of view of the radioaltimeter depending on requirements.

In a first solution, said at least one lens is selected from a set of interchangeable lenses of respective optical configurations previously identified depending on said plurality of respective given loads.

In this first solution and by way of example, proposals are made to use a converging lens for focusing the basic field of view of the radioaltimeter, which basic field of view is equivalent to the optimum field of view. Under such circumstances, the converging lens is selected from a plurality of converging lenses in a set of converging lenses having respective optical configurations that are defined to match a plurality of ways of transporting one or more given slung loads.

Still in accordance with this solution and by way of example, proposals are made to use a diverging lens that enlarges the basic field of view of the radioaltimeter, which basic field of view is equivalent to a given limited field of view. By way of example, such a given limited field of view may be obtained by fitting the radio apparatus with a specific focusing member, as conventionally provided using a horn, which member is selected from a set of specific focusing members that confer the basic field of view supplied by the antennas to the radioaltimeter. Under such circumstances, the diverging lens is selected from a plurality of diverging lenses in a set of diverging lenses having respective optical configurations that are defined to match the plurality of basic fields of view that can potentially be provided by antennas fitted with a specific focusing member previously selected from a set of specific focusing members.

In this context, a lens of given optical configuration that has been identified by taking account of the conditions for transporting a given slung load and after taking account of the predetermined basic field of view of the radioaltimeter, is installed temporarily on the radio apparatus when a flight mission of the rotorcraft involves transporting a given slung load. It can be seen that a plurality of lenses with respective optical configurations are interchangeable depending on a plurality of previously-identified conditions for transporting a slung load.

In this context, it is preferable for the operation of replacing a lens fitted to the radio apparatus with another lens to be easy to perform both in a workshop and on a rotorcraft standing on the ground, and while using assembly means that are advantageously easily reversible. It should naturally be understood that such assembly means are means for assembling at least the lens, and possibly also the radome and/or the antennas, on the radio apparatus and/or directly on an outside wall of the rotorcraft, in particular as provided by a tail boom of the rotorcraft.

It should be observed that such assembly means enable the lens to be removed easily in order to reestablish the basic field of view of the radioaltimeter, and/or in order to enable the basic field of view of the radioaltimeter to be modified in specific manner by another lens of optical configuration that matches requirements.

In a second solution, the optical configuration of said at least one lens is modifiable depending on the limited field of view deduced for the radioaltimeter as a function of a load under consideration for transporting by the sling equipment.

More particularly, a lens is installed permanently on the radio apparatus and the optical configuration of the lens is adapted to the flight mission of the rotorcraft in order to adapt the field of view of the radioaltimeter selectively to transporting or not transporting a slung load, and where applicable depending on specific ways of transporting a given slung load.

It is desirable for the optical configuration of a given lens fitted to the radio apparatus to be easily adaptable depending on requirements. For this purpose, the following provisions are proposed that may be considered in isolation or in combination of at least any two of them:

either installing at least one lens of fixed optical configuration on the radio apparatus. Under such circumstances, the lens is selected from a set of interchangeable lenses having respective optical configurations. The optical configurations of the lenses in the set are defined in particular as mentioned above depending on whether or not a load is to be transported by the sling equipment, and where applicable depending on the various ways that might be applied for transporting the slung load;

or to fit at least one said lens with means for modifying its optical configuration depending on requirements. Under such circumstances, the optical configuration of said at least one lens can be modified to match the limited field of view of the radioaltimeter as previously deduced depending on whether or not a said given load is to be transported by sling;

or else to install said at least one lens on the radio apparatus so as to be movable relative to the antennas. Under such circumstances, said at least one said lens is selectively movable between an active position in which the lens modifies the basic field of view of the radioaltimeter, and a refracted position in which the lens is disengaged from the antennas and has no effect on the basic field of view of the radioaltimeter.

Modifying the optical configuration and/or the position of said at least one lens relative to the antennas makes it possible to modify and/or interrupt modification of the basic field of view of the radioaltimeter. Such modifications and/or interruptions of the effects produced by the lens may preferably be carried out in flight by the crew of the rotorcraft, between a load transporting situation in which the rotorcraft is transporting a slung load, and an ordinary flight situation of the rotorcraft in which the rotorcraft is not transporting a slung load.

The present invention also provides a radioaltimeter for a rotorcraft that is suitable for performing a method as described above.

The radioaltimeter comprises a computer for determining the height of a rotorcraft above the ground on the basis of data supplied by radio apparatus having at least one set of two plane configuration antennas and a radome for protecting the antennas, in particular from the outside environment.

Conventionally, the antennas predefine between them a "basic" field of view of the radioaltimeter and they supply data to the computer as a result of exchanging electromagnetic signals between each other.

In the present invention, such a radioaltimeter is recognizable mainly in that the radio apparatus further includes at least one lens for modifying said basic field of view of the radioaltimeter as defined by said plane configuration antennas.

Said lens may either be a converging lens for focusing the basic field of view of the radioaltimeter or else a diverging lens for enlarging the basic field of view of the radioaltimeter.

In a particular embodiment of the radioaltimeter, said lens is incorporated in the radome, then referred to as an "optical" radome.

For example, the optical radome is advantageously made up of at least two layers comprising an outer layer of waterproof cellular material containing an inner layer forming the lens.

The optical radome is made in particular of composite materials commonly used in the field of aviation. The outer layer is a protective layer for the lens, e.g. derived from a synthetic foam, serving in particular to present an obstacle to moisture passing therethrough in order to avoid corrosion of the lens and/or degradation of its performance.

It should be observed that when such an optical radome is installed on board, it presents the advantage of hardly increasing the weight of the rotorcraft at all.

The inner layer forming the lens is potentially embedded within the outer layer, e.g. being obtained using an epoxy resin or being made of glass so as to enhance its function of modifying the basic field of view of the radioaltimeter.

In an embodiment, said at least one lens and the radome, and possibly also the antennas, are assembled together in a common structural assembly having means for reversibly attaching it to a structure external to the radioaltimeter.

It should naturally be understood that the external structure does not constitute a member forming part of the radioaltimeter, but that serves conventionally to define the ways in which said reversible attachment means are arranged so as to enable the radio apparatus to be mounted on an external element, such as in particular an outside wall of the aircraft.

Furthermore, in certain circumstances, it is possible that the lens may return "reflected" electromagnetic waves towards the transmit antenna as a result of the lens receiving "incident" electromagnetic waves coming from the radio signals transmitted by the transmit antenna, these electromagnetic waves being transmitted towards the lens. Unfortunately, such reflected waves can degrade the performance of the radio apparatus and can make the calibration of the radioaltimeter unreliable by increasing the standing wave ratio between the transmit antenna of plane configuration and the lens.

In order to avoid such a drawback, and where necessary, a specific embodiment of the invention is proposed in which the lens is provided with a specific layer referred to as a "filter" layer. Said filter layer generates a phase shift between the reflected waves so as to make them evanescent, so that the pertinence of the electromagnetic signals generated by the transmit antenna is unaffected.

For example, said filter layer is provided on the outside surface of the lens, at least in its portion facing towards the transmit antenna. Such a filter layer may potentially be formed, in isolation or in combination:

by a coating covering the lens, in particular being obtained from a specific material suitable for producing said phase shift between the reflected waves; and by a specific portion in relief incorporated in the lens and giving rise to said phase shift between the reflected waves, such as a portion in relief in the shape of a succession of projections and recesses, e.g. constituted by a succession of splines leaving grooves between them.

The radioaltimeter may advantageously be provided with adjustment means for adjusting the lens and suitable for modifying the effects of the lens on the basic field of view of the radioaltimeter.

In an embodiment, the adjustment means for adjusting the lens are means for modifying the optical configuration of the lens. Such a modification of the optical configuration of the lens naturally modifies its optical characteristics.

By way of example, such means for modifying the optical configuration of the lens may be means for controlling a flow of fluid inside the lens so as to modify its optical characteristics.

For example, the lens may be formed by a plurality of plies forming between them at least one fluid flow pouch, a flow of fluid inside said at least one pouch modifying the optical configuration of said lens. Naturally, the shape of said pouch, which is determined at least depending on the shape and/or the arrangement of the plies between one another, is adapted to perform the modification to the scope of the basic field of view of the radioaltimeter that is to be obtained by means of the lens.

In another embodiment, the adjustment means for adjusting the lens are means for imparting relative movement between the antennas and the lens that is movably mounted on the radio apparatus.

The radioaltimeter may also advantageously be fitted with retraction means for retracting the lens and suitable for moving the lens relative to the antennas. The lens is movably mounted on the radio apparatus to move between an active position in which the lens modifies the basic field of view of the radioaltimeter and a retracted position in which the lens is placed outside the basic field of view of the radioaltimeter and consequently has no effect on the basic field of view of the radioaltimeter.

In this context, the modification made by the lens to the basic field of view of the radioaltimeter can be adapted voluntarily in flight depending on requirements, either by a crew member or spontaneously by automatic means. Such adaptation of the lens is performed in particular depending on whether the flight mission of the rotorcraft involves or does not involve carrying a slung load and/or depending on the field of mobility of the load transported by sling that needs to be taken into consideration.

The characteristics of the modification to the field of view of the radioaltimeter as performed by the lens can thus potentially be adapted, in isolation or in combination, by varying, depending on requirements: the focal length of the lens; the direction in which the lens points; the shape of the lens; optical properties of the material constituting the lens; or possibly physical properties or chemical properties of the material constituting the lens.

More particularly, in an embodiment, the lens is movably mounted on a support of the radio apparatus and is movable by drive means forming part of any one of at least the lens adjustment means and the lens retraction means.

The drive means of the lens may equally well be manual drive means enabling an operator to move the lens and/or automatic drive means for moving the lens. Such automatic drive means comprise in particular at least one actuator that is operated under the control of control means.

Said control means may comprise equally well, in isolation or in combination, manual control means operable by an operator and/or automatic control means operable on receiving an "activation" setpoint from the control means. Such an activation setpoint is generated in particular by a calculation member forming part of the radioaltimeter and identifying the effects to be produced by the lens on the basic field of view of the radioaltimeter.

Furthermore, it should be observed that the computer of the radioaltimeter commonly includes a main algorithm calculating the height of the rotorcraft above the ground on the basis of said data supplied by the radio apparatus.

In this context, and in an advantageous embodiment, the computer of the radioaltimeter also includes an auxiliary algorithm, possibly incorporated in the main algorithm, for taking account of the effects that are produced specifically by the lens on the field of view of the radioaltimeter. Such provisions make it possible to improve the window in which the radioaltimeter can detect height above the ground when using the lens.

The present invention also provides a rotorcraft fitted with a radioaltimeter and suitable for performing a method as described above.

More particularly, the rotorcraft is fitted with a said radioaltimeter including said computer for identifying the height of the rotorcraft above the ground on the basis of said data supplied by a said radio apparatus having at least one said set of two antennas that co-operate by exchanging electromagnetic signals.

The antennas are conventionally of plane configuration in order to optimize the extent of the field of view of the radioaltimeter when the rotorcraft is not carrying a slung load. The antennas are installed on the underside of the rotorcraft, as considered when standing on the ground, and they are protected by at least one said radome. Conventionally, the antennas define between them a predefined "basic" field of view of the radioaltimeter.

The rotorcraft of the present invention is also provided with said sling equipment for transporting a said load swinging under the rotorcraft in a said previously identified given field of mobility.

In this context, the rotorcraft of the present invention is recognizable mainly in that the radio apparatus includes at least one said lens for modifying the basic field of view of the radioaltimeter at least along the longitudinally-extending axis of the rotorcraft. The lens modifies the basic field of view of the radioaltimeter as follows:

in the event of not transporting said load by the sling equipment, optimizing the field of view of the radioaltimeter by imparting it a predefined field of view referred to as the "optimum" field of view; and in the event of transporting said load by the sling equipment, reducing said optimum field of view by imparting to the radioaltimeter a field of view referred to as a "limited" field of view, as a function of the field of mobility of said load transported swinging under the rotorcraft.

In an embodiment relating for example to a converging lens for focusing the basic field of view of the radioaltimeter, the focusing surface of the lens that modifies the basic field of view of the radioaltimeter converges along the longitudinally-extending and transversely-extending axes of the rotorcraft. In this context, it is chosen to restrict the optical field of view of the radioaltimeter in all of the dimensions that define the longitudinally-extending plane of the rotorcraft.

Nevertheless, and as mentioned above, it is preferable to enlarge the field of view of the radioaltimeter as much as possible when the rotorcraft is performing turns and while it is not transporting a load by means of the sling equipment.

That is why in a preferred embodiment relating by way of example to a converging lens for focusing the basic field of view of the radioaltimeter, the surface of the lens that modifies the basic field of view of the radioaltimeter is convex along the longitudinally-extending axis of the rotorcraft and is essentially plane along the transversely-extending axis of the rotorcraft.

In this context, it is preferred to provide the lens with rounded edges. Said rounded edges are provided at the ends of the surface of the lens that modifies the basic field of view of the radioaltimeter, said rounded ends being considered along the transversely-extending axis of the rotorcraft. Such rounded edges for the lens serve to avoid undesirable diffraction that can degrade the radiation pattern of the antennas.

Naturally, such provisions specific to a converging lens seeking to modify the basic field of view of the radioaltimeter selectively along the longitudinal extending axis and/or along the transversely-extending axis of the rotorcraft are applied when the basic field of view of the radioaltimeter is equivalent to the optimum field of view.

When the basic field of view of the radioaltimeter is equivalent to the limited field of view, then a diverging lens is used conversely for the purpose of obtaining the optimum field of view while the lens is in use.

On the basis of the above-specified rules for shaping a converging lens relative to the longitudinal and/or transverse axes of the rotorcraft, it is possible to transpose such rules to a diverging lens so as to obtain an enlargement of the basic field of view, which basic field of view is then equivalent to the limited field of view. The shape of the diverging lens for enlarging the basic field of view is easily deduced by adapting said rules in application of known laws of optics, and naturally as a function of the basic field of view as considered relative to the longitudinally-extending axis and/or the transversely-extending axis of the rotorcraft so as to obtain the above-mentioned advantages concerning movements of the rotorcraft in pitching and/or rolling depending on whether or not it is transporting a load by means of the sling equipment.

Nevertheless, the flight missions of a rotorcraft are not always limited to transporting loads by sling, with the exception of rotorcraft that are structurally organized specifically for that purpose.

The main advantage of the invention is to be able to adapt the field of view of the radioaltimeter for flight missions that are marginal for a particular rotorcraft, such that the ordinary field of view of the radioaltimeter is modified occasionally by the lens in the event of an unusual flight mission.

For example, when transporting a slung load is only an occasional flight mission of a rotorcraft, it is preferable to use a converging lens that focuses the basic field of view of the radioaltimeter, which basic field of view is equivalent to the optimum field of view that is used more frequently by the rotorcraft.

Also by way of example, in the opposite situation where transporting a slung load constitutes a frequent flight mission of the rotorcraft, it is preferred to use a diverging lens for enlarging the basic field of view of the radioaltimeter, which basic field of view is then equivalent to a limited field of view as used more frequently by the rotorcraft. Under such circumstances, it should be considered that the characteristics of the diverging lens may advantageously be adapted in the above-specified manner to match requirements.

Nevertheless, in general, a particular embodiment is proposed in which an operator can easily install and remove the lens on board a rotorcraft depending on the flight mission of the rotorcraft.

Another particular embodiment is proposed in which the lens is mounted on the radio apparatus to be retractable between an active position in which the lens modifies the basic field of view of the radioaltimeter and a refracted position in which the lens does not interfere with the basic field of view of the radioaltimeter.

More particularly, in an embodiment, the lens is removably mounted on the radio apparatus and is interchangeable from among a set of lenses of respective optical configurations.

Mounting the lens removably enables it to be installed on board the rotorcraft in optional manner, and also makes it possible to replace a lens having a given optical configuration with another lens selected from a set of lenses having specific individual optical configurations. A lens may be selected by an operator from among the lenses of said set of lenses and can easily be installed on board the rotorcraft while it is on the ground and depending on requirements, and in particular depending on whether or not the rotorcraft is to transport a slung load, and/or, where appropriate, depending on the particular ways in which the load is to be transported by sling and that define its field of mobility.

Furthermore, mounting the lens should not degrade the outside surfaces of the rotorcraft, nor should it affect the waterproofing provided by the radio apparatus to protect the antennas from infiltration of moisture.

For this purpose, and in an embodiment, the lens may potentially be removably mounted on the radio apparatus at least in part by means of means for fastening the antennas on an outside wall of the rotorcraft.

Such fastener means are conventionally formed by fastener members, which may be arranged as screw fasteners or as elastically deformable snap-fastener members, for example. Such fastener members may be used for fastening the lens, while not degrading the outside wall of the rotorcraft by the fastener means that are used for mounting the lens on board the rotorcraft.

Naturally, it should be understood that the lens is potentially interchangeable by replacing the optical radome by selecting a radome from a set of a plurality of optical radomes incorporating respective lenses having different structures. In addition, an optical radome can easily be removed in order to be replaced by a radome that does not have any lens when there is no need to modify the basic field of view of the radioaltimeter.

In this context, it should be considered that the radio apparatus may potentially comprise either a first module grouping together at least the antennas and the lens, or else a second module grouping together in a single structural assembly the antennas, the lens, and the radome.

It should also be observed that each of the antennas may potentially be fitted individually with a respective lens or that the antennas may potentially be fitted with a lens in common.

As mentioned above, the radioaltimeter fitted to the rotorcraft may potentially be fitted with said automatic control means.

Under such circumstances, the sling equipment is advantageously fitted with detector means for detecting that the sling equipment is carrying a load. By way of example, such detector means may comprise dynamometer means forming part of the sling equipment and measuring the forces to which the sling is subjected.

Said detector means constitute information to said calculation member of the radioaltimeter and they are the means for generating said activation setpoint of the control means as a result of the transported load being released. Said detector means generating the activation setpoint for the control means causes said means for retracting the lens to be operated to move said lens between said active position and said retracted position.

These provisions are such that detection of the transported load being released from the rotorcraft spontaneously causes the lens to be moved from the active position to the retraced position, with such movement of the lens automatically restoring the basic field of view to the radioaltimeter. In this context, when no load is being transported by sling, it should be considered that retracting the converging lens provides the optimum field of view as provided by the basic field of view of the radioaltimeter, and conversely that retracting a diverging lens provides the limited field of view as obtained by the basic field of view of the radioaltimeter.

Still in the context of the radioaltimeter being fitted with said automatic control means, the computer supplies information to said calculation member forming part of the radioaltimeter by potentially generating said activation setpoint for the control means causing said refraction means to be operated to move the lens from said retracted position to said active position.

The computer generating said activation setpoint may be caused in particular as a result of the computer detecting a height above the ground representative of transporting a slung load on the basis of data supplied by the radio apparatus, in particular by the computer detecting a reflection of radio signals exchanged between the antennas coming from the load being transported by sling.

The radioaltimeter is capable of identifying interference between the signals exchanged by the antennas and a load transported by sling when the height above the ground as deduced by the radioaltimeter corresponds substantially to the known distance between the radio apparatus and the load.

BRIEF DESCRIPTION OF THE SEVERAL VIEWS OF THE DRAWINGS

Embodiment of the present invention is described with reference to the figures of the accompanying sheets, in which:

FIG. 3 is made up of three diagrams (c), (d), and (e), respectively showing various ways of performing a method of the present invention;

FIG. 4 is a diagram showing a method in accordance with the present invention and showing general actions implemented by the radioaltimeter of the rotorcraft shown in FIGS. 1 and 2;

FIG. 5 is a diagram showing particular steps forming part of a method in accordance with the present invention;

FIG. 6 is made up of a plurality of diagrams showing an embodiment of a lens fitted to a radioaltimeter in accordance with the present invention, shown respectively in perspective in diagram (f), in transverse profile in diagram (g), and in longitudinal profile in diagram (h);

FIG. 7 is made up of two diagrams (i) and (j) respectively showing various embodiments of a lens fitted to a radioaltimeter in accordance with the present invention;

FIGS. 8, 9, and 10 show various respective ways of mounting a lens fitted to a radioaltimeter in accordance with the present invention on board a rotorcraft;

FIGS. 11, 12, 13, and 14 show various ways of moving a lens fitted to a radioaltimeter in accordance with the present invention; and FIG. 15 is made of two diagrams (k) and (l) showing respective embodiments of a specific shape for making a lens fitted to a radioaltimeter in accordance with the present invention.

DETAILED DESCRIPTION OF THE INVENTION

Figure 1:
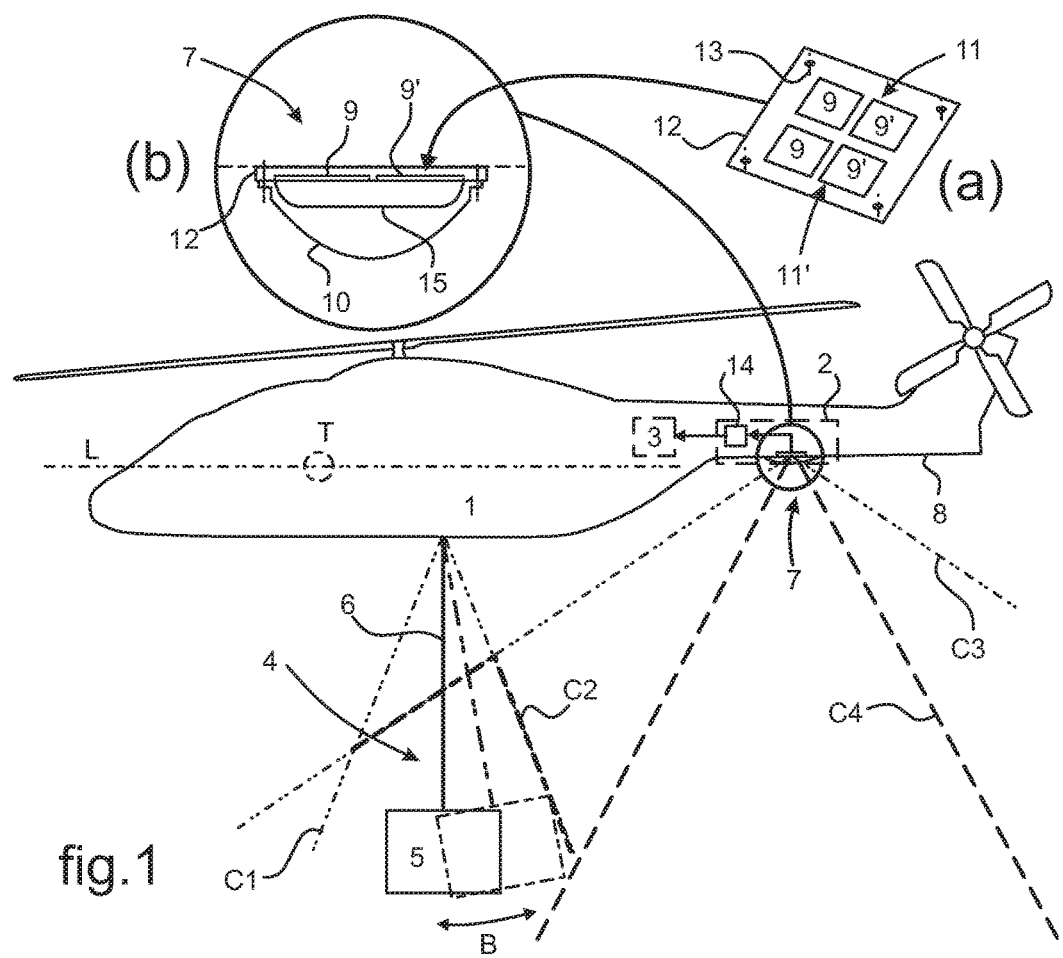
FIGS. 1 and 2 are respectively a profile view and a perspective view of a rotorcraft fitted with a radioaltimeter in accordance with the present invention, FIG. 1 including two details (a) and (b) showing specific members of the radioaltimeter.
Figure 2:
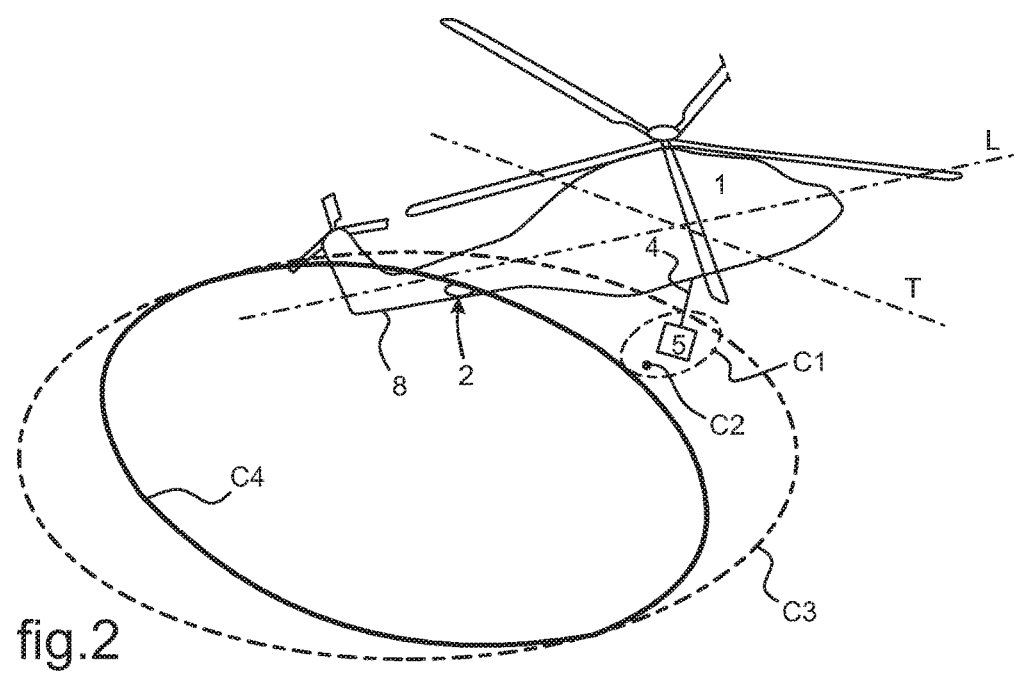

FIGS. 1 and 2 show a rotorcraft fitted with a radioaltimeter 2 providing the crew of the rotorcraft with information about the height of the rotorcraft 1 above the ground, in particular via display means (see screen 3 in FIG. 1). The rotorcraft 1 is also fitted with sling equipment 4 for transporting a load 5 that is carried swinging beneath the rotorcraft 1 at the free end of a sling 6 fastened at its other end to the rotorcraft 1, in particular via a winch.

It should be observed that the rotorcraft 1 conventionally extends in a longitudinal orientation L extending between the front and the rear of the rotorcraft 1 as considered when standing on the ground, and in a transverse orientation T that is defined as being perpendicular to said longitudinal orientation L of the rotorcraft 1, extending between its sides.

In FIG. 1, more particularly, the radioaltimeter 2 conventionally comprises radio apparatus 7, such as shown in diagram (b) for example. The radio apparatus 7 is commonly installed under a tail boom 8 of the rotorcraft 1, as in the embodiment shown in FIGS. 1 and 2.

In diagram (b) in particular, the radio apparatus 7 comprises at least one set of two antennas 9, 9' that are protected from the environment outside the rotorcraft 1 by a radome 10. The radio apparatus 7 potentially comprises a plurality of sets 11, 11', each of two antennas 9, 9', e.g. two such sets in the embodiment shown in diagram (a).

More particularly, in diagram (a), the antennas 9, 9' of a set 11, 11' are installed on a support 12 for mounting the antennas 9, 9' on board the rotorcraft. The antennas 9, 9' are typically installed on the rotorcraft by fastening the support 12 onto the outside wall of the rotorcraft, via fastener means 13, such as screws, for example.

The antennas 9, 9' are in a plane configuration in order to define between them a basic field of view of the radioaltimeter. The antennas 9, 9' of a given set 11, 11' co-operate with each other by exchanging electromagnetic signals in order to generate data that is used by a computer 14 of the radioaltimeter 2 (see FIG. 1) for determining the height of the rotorcraft 1 above the ground.

Typically, the load 5 is transported swinging (B) under the rotorcraft 1 by the sling equipment 4, and consequently it moves under the rotorcraft 1 in a predefined field of mobility C1. More particularly, under the effect of the rotorcraft traveling forwards, the load moves essentially towards the rear of the rotorcraft within said field of mobility C1.

Such a field of mobility C1 can vary, in particular depending on how the slinging equipment 4 is organized, depending on the relative position between the slinging equipment 4 and the radio apparatus 7, depending on the characteristics specific to the load 5 being transported, such as its weight and its shape, in particular, and also depending on the structure of the rotorcraft 1, and in particular its propulsion capacity.

In the embodiment shown in FIGS. 1 and 2, the basic field of view of the radioaltimeter 2 as supplied by the antennas 9, 9' is more particularly an optimum field of view C3, of scope that is as large as possible. When the rotorcraft 1 is not transporting a load 5 by means of the sling equipment 4, such provisions make it possible to increase the ability of the radioaltimeter 2 to measure the height of the rotorcraft 1 above the ground regardless of its flight attitude in pitching and/or in rolling, in particular when performing steeply-banked turns.

In this context, it can be seen in FIG. 1 that the load 5 transported by sling can interfere with the signals that are exchanged between the antennas 9, and 9'. To avoid such interference, a field C2, referred to as the "interference" field, may be defined by the intersection between the optimum field of view C3 of the radioaltimeter 2 and the field of mobility C1 of the load 5. When the load 5 penetrates into the optimum field of view C3 of the radioaltimeter 2, the data supplied by the antennas 9, 9' is no longer reliable because of potential interference between the load 5 and the signals exchanged between the antennas 9 and 9'.

In order to enable the radioaltimeter 2 to provide a reliable measurement of the height of the rotorcraft 1 above the ground while transporting a load 5 by means of a sling, the radio apparatus 7 also includes a lens 15 (see diagram (b)) modifying the basic field of view of the radioaltimeter 2, and more specifically in the example shown, modifying the optimum field of view C3 of the radioaltimeter 2 as supplied by the antennas 9 and 9'.

Under such conditions and in the example shown, the lens 15 is more particularly a converging lens for focusing the basic field of view of the radioaltimeter 2. The optical configuration of the lens 15 is determined beforehand in order to obtain a reduction in the basic field of view of the radioaltimeter 2, which field of view is the optimum field of view. More particularly, the lens 15 is used to reduce the scope of the optimum field of view C3 of the radioaltimeter 2 to a limited field of view C4 of the radioaltimeter 2. Such a limited field of view C4 of the radioaltimeter is shown in FIGS. 1 and 2, and it is defined by excluding the field of mobility C1 of the load from the optimum field of view C3 of the radioaltimeter 2.

As shown in FIG. 3, it should nevertheless be understood that in a general approach of the present invention, the lens 15 may be a converging lens 15a (diagram (d)) or a diverging lens 15b (diagram (e)) depending on the scope of the basic field of view C of the radioaltimeter 2.

In the various diagrams of FIG. 3, and as mentioned above with reference to FIGS. 1 and 2, the radioaltimeter 2 comprises radio apparatus 7 involving a computer 14 and antennas 9, 9' of plane configuration that supply the basic field of view C of the radioaltimeter 2, in order to determine the ground height Hs of the rotorcraft for the onboard instrumentation of the rotorcraft.

Nevertheless, the flight missions M of the rotorcraft may vary, and such rotorcraft missions may or may not involve transporting a load via the sling equipment. The diagrams in FIG. 3 take into consideration flight missions M1 and M2 of the rotorcraft that differ from each other, depending on whether or not a load is being transported by the sling equipment of the rotorcraft.

In diagram (c), which shows a general approach of the present invention, the lens 15 is used selectively for modifying the basic field of view C of the radioaltimeter 2 depending on the flight mission of the rotorcraft. For the flight mission M2, the lens 15 is not used to modify the basic field of view C of the radioaltimeter 2. For the flight mission M1, the lens 15 is used to modify the basic field of view C of the radioaltimeter, so that its scope is modified in such a manner as to obtain a field of view Cm that is referred to as the "modified" field of view.

Starting from said general approach shown in diagram (c), diagrams (d) and (e) show various techniques for performing the method of the present invention depending on the respective objectives of the flight missions M1 and M2.

More particularly, in diagram (d) the antennas 9, 9' provide the radioaltimeter with a basic field of view C that is equivalent to the optimum field of view C3. In this context, it is considered that the flight mission M1 of the rotorcraft is a flight mission M1a involving transporting a load by the sling equipment of the rotorcraft. Conversely, it is also considered that the flight mission M2 of the rotorcraft is a flight mission M2a that does not involve transporting a load by means of the sling equipment of the rotorcraft.

In the context shown in diagram (d), when the flight mission M of the rotorcraft is the flight mission M1a, the lens 15 is more specifically formed by a converging lens 15a focusing the basic field of view C of the radioaltimeter 2 that is equivalent to the optimum field of view C3. As a result of using the lens 15a, the modified field of view Cm is the limited field of view C4. Conversely, when the flight mission M of the rotorcraft is the flight mission M2a, the converging lens 15a is not used, as consequently the basic field of view C of the radioaltimeter is conserved for the purpose of calculating the ground height Hs of the rotorcraft.

Still more particularly, in diagram (e), the antennas 9, 9' provide the radioaltimeter with a basic field of view C that is equivalent to a limited field of view C4. In this context, it is considered that the flight mission M1 of the rotorcraft is a flight mission M1b involving no load being transported by the sling equipment of the rotorcraft. Conversely, it is also considered that the flight mission M2 of the rotorcraft is a flight mission M2b involving transporting a load by means of the sling equipment of the rotorcraft.

In the context shown in diagram (e), when the flight mission M of the rotorcraft is the flight mission M2b, the lens 15 is more specifically formed by a diverging lens 15b enlarging the basic field of view C of the radioaltimeter 2, which is equivalent to the limited field of view C4. As a result of using the lens 15b, the modified field of view Cm is the optimum field of view C3. Conversely, when the flight mission M of the rotorcraft is the flight mission M1b, the diverging lens 15b is not used, and as a result the basic field of view C of the radioaltimeter is conserved for calculating the height Hs of the rotorcraft above the ground.

In order to avoid redundant description of the invention, FIGS. 4 to 15 show the invention assuming that the lens 15 used is a converging lens 15a that focuses the basic field of view C of the radioaltimeter 2, which basic field of view is equivalent to the optimum field of view C3. It should be taken into account that the particular techniques of the invention as described with reference to FIGS. 4 to 15 can be transposed without difficulty so as to be appropriate for using a lens 15 that is formed by a diverging lens 15b that enlarges the basic field of view C of the radioaltimeter 2, which basic field of view is equivalent to a given limited field of view C4.

In FIG. 4, the rotorcraft 1 is fitted with a radioaltimeter 2 as shown in FIGS. 1 and 2. In order to avoid interference between the transported load 5 and the signals exchanged by the radioaltimeter 2 via the lens 15, it is proposed to perform the operations mentioned below.

Prior to the rotorcraft 1 taking off, an operator 16 uses a calculation unit 17 to identify at least one field of mobility C1 of a predefined load 5 that is to be transported by the sling equipment 4 of the rotorcraft 1.

Therefore, the operator 16 identifies the interference field C2 as the intersection or overlap between the field of mobility C1 of the load 5 and the optimum field of view C3 of the radioaltimeter 2 as provided by the antennas 9 and 9'. Thereafter, the operator 16 identifies the limited field of view C4 of the radioaltimeter and the optical configuration CL of the lens 15 suitable for focusing the optimum field of view C3 of the radioaltimeter 2 in order to reduce it to the limited field of view C4 of the radioaltimeter 2. The lens 15 is then installed on the rotorcraft 1.

It may be observed at this stage of the description that the operator 16 can determine a plurality of optical configurations CLn specific to various lenses 15' by applying the operations described below in association with the specific characteristics of various loads 5n and/or of various pieces of sling equipment 4n, and indeed various sets 11n of antennas 9n, 9n' that may be installed on board the rotorcraft 1.

Under such circumstances, it should naturally be understood that the operator 16 applies the method of the invention to identify respectively for each of the various configurations for transporting various loads 5n by sling:

a plurality of said fields of mobility C1n;

a plurality of said interference fields C2n possibly taking account of a plurality of optimum fields of view C3n of the radioaltimeter 2 as potentially supplied respectively by the plurality of sets 11n of antennas 9n, 9'n; and a plurality of said limited fields of view C4n of the radioaltimeter 2, and consequently a plurality of optical configurations CLn for the plurality of lenses 15n suitable for focusing the optimum fields of view C3n of the radioaltimeter 2, depending on requirements. The various lenses 15, 15n are interchangeable depending on the sling transport configuration for transporting a given load 5 by means of the rotorcraft 1 in order to focus the optimum field of view C3 of the radioaltimeter depending on requirements.

It should be observed that the lens 15 may be fitted with means for adjusting its optical configuration CL, as described below with reference to FIGS. 13 and 14. Under such circumstances, it should naturally be understood that various optical configurations CLn of a given lens 15 can be identified in order to use a single lens 15 to focus the optimum field of view C3n of the radioaltimeter 2 in a plurality of ways depending on requirements.

In FIG. 5, the lens 15 is installed on the rotorcraft that is shown in the preceding figures. The antennas 9, 9' of the radioaltimeter 2 conventionally transmit data 18 to the computer 14, on the basis of which the computer 14 determines the height Hs of the rotorcraft above the ground as displayed on the screen 3.

The radioaltimeter 2 is fitted with means 19, referred to as means for adjusting the lens 15, that are suitable for modifying the effects of reducing said optimum field of view C3 of the radioaltimeter 2 depending on said various optical configurations CL, CLn of the lens 15 as previously determined depending on requirements, and more particularly as previously determined respectively depending on the various fields of mobility C1, Cn specific to a plurality of given loads 5.

The computer 14 integrates information about said various optical configurations CLn of the lens 15, e.g. either as a result of them previously being integrated in the memory means 20 of the computer 14, or else as a result of them being determined by the operator 16 using the computer means 14. Depending on requirements, an optical configuration CL is identified for the lens 15 by the operator 16.

After the operator 16 has identified the optical configuration CL to be applied to the lens 15, the adjustment means 19 of the lens 15 are used to reduce the optimum field of view of the radioaltimeter 2 depending on requirements.

Furthermore, the radioaltimeter 2 is also fitted with means 21, referred to as means for retracting the lens 15, suitable for moving the lens relative to the two antennas 9, 9' in order to interrupt, or conversely to give rise to, the effect of the lens 15 reducing said optimum field of view C3 of the radioaltimeter 2.

For this purpose, the lens 15 is movably mounted on the radio apparatus 7 and is movable by drive means 22 between an active position and a retracted position. In the active position, the lens reduces the optimum field of view of the radioaltimeter 2. In the retracted position, the lens 15 has no effect on the optimum field of view of the radioaltimeter 2.

The drive means 22 for driving the lens 15 may potentially be manual means 23 for enabling the operator 16 to drive the lens 15, and/or automatic drive means 24 including an actuator 25 for moving the lens 15 under the control of a control means 26. Such control means 26 may potentially be manual control means 27 that can be activated by the operator 16 and/or automatic control means 28 that can be activated by receiving a so-called "activation" setpoint 29.

By way of example, said activation setpoint 29 may be generated by the sling equipment 4 being fitted with detector means 30 for detecting that the transported load 5 has been released. Once the rotorcraft has put the transported load down, it is appropriate to reestablish use of the optimum field of view C3 of the radioaltimeter 2 by retracting the lens 15.

Conversely, said activation setpoint 29 may potentially be generated by the computer 14 in order to move the lens into the active position as a result of the computer 14 detecting a height Hs above the ground representative of transporting a load 5 by means of a sling, on the basis of the data 18 supplied by the radio apparatus 7.

Other solutions may be applied for detecting that the sling equipment 4 is transporting a load, and consequently for generating the activation setpoint 29 seeking to move the lens 15 between its active position and its refracted position. For example, optoelectronic type detection equipment may be used for detecting that a load 5 is being transported by sling and possibly also for identifying the load 5 being transported and consequently for identifying its potential interference with the signals exchanged between the antennas 9 and 9' of the radioaltimeter 2.

FIG. 6 shows an embodiment of a lens 15 fitted to a radioaltimeter of the present invention. In this embodiment, the focusing surface 31 of the lens 15 is of a simple shape, in which:

the focusing surface 31 of the lens 15 is convex in a first of its dimensions D1, as can be seen more particularly in diagram (h). When the lens 15 is installed on board the rotorcraft, the lens 15 is arranged with its said first dimension D1 parallel to the direction L in which the rotorcraft extends longitudinally; and the focusing surface 31 of the lens 15 is essentially plane in a second of its dimensions D2 extending perpendicularly to the first dimension D1 of the lens 15, as can be seen more particularly in diagram (g). The ends of the focusing surface 31 of the lens 15 when considered along its second dimension are given rounded edges 32, 32'. When the lens 15 is installed on board the rotorcraft, the lens 15 is arranged so that its said second dimension D2 is perpendicular to the direction L in which the rotorcraft extends longitudinally.

Other, more complex, shapes possible for a lens 15 fitted to a radioaltimeter of the present invention are shown respectively in the diagrams (i) and (j) of FIG. 7.

In FIG. 8, a lens 15 fitted to a radioaltimeter in accordance with the present invention is advantageously incorporated in a radome 10', which is then said to be a "focusing" radome, that forms part of the radio apparatus of the radioaltimeter. The focusing radome 10' may advantageously be made up of at least two layers, for example.

An inside layer 33 of the focusing radome 10' may for example be made of an epoxy resin forming the lens 15. The lens 15 is embedded in an outer layer 34 of waterproof cellular material, such as a synthetic foam. The outside layer 34 provides an obstacle to moisture passing through the focusing radome 10', thereby protecting the lens and the antennas of the radioaltimeter. Said antennas 9, 9' may potentially be incorporated in the focusing radome 10', or they may be arranged otherwise.

In FIG. 9, radio apparatus 7 forming part of a radioaltimeter in accordance with the present invention comprises a structural assembly 35 grouping together a radome 10, a lens 15, and antennas 9, 9'. Said structural assembly 35 is provided with assembly means 36 for attaching it in easily reversible manner with a structure 37 outside the radioaltimeter, in order to enable it to be fastened to an outside wall of the rotorcraft.

In FIG. 10, radio apparatus 7 forming part of a radioaltimeter in accordance with the present invention comprises at least two antennas 9, 9' and a lens 15 for focusing the optimum field of view of the radioaltimeter as obtained by the antennas 9, 9' of plane configuration. Naturally, the radio apparatus 7 also includes a radome that is not shown in order to make the figure easier to read.

Lenses 15, 15a, or 15b' are conventionally installed on a structure 37 external to the radioaltimeter, in particular formed by the outside wall of a rotorcraft, this being done by fastener means 38 that are easily reversible, typically making use of screw fastener members and resilient engagement members, for example. The antennas 9, 9' are previously installed on a support 39 that is then used for installing the antennas 9, 9' on the outside wall of the rotorcraft via the fastener means 38.

The lens 15 is mounted on a plate 40 that is fastened to the support 39 by making use of the fastener means 38 for fastening the antennas 9, 9' to the structure 37. Such provisions make it possible to avoid damaging the outside wall of the rotorcraft, by avoiding any need to degrade it by using additional fastener means specific to the lens 15.

It can be seen from the provisions shown in FIGS. 9 and 10 that the lens 15 forming part of the radioaltimeter is easily removable, and consequently can easily be replaced depending on requirements with some other lens selected from a set of lenses having respective optical configurations.

In FIGS. 11 and 12, a radioaltimeter in accordance with the present invention is potentially fitted with retraction means 21 enabling the lens 15 to be moved between said active position and said refracted position, as described above with reference to the description of FIG. 5.

More particularly, the lens 15 is mounted to move on a support 43 of the radio apparatus forming part of the radioaltimeter. Such a support 43 is advantageously used for receiving antennas of the radioaltimeter in order to mount them on board the rotorcraft, such as for example the support 39 shown in FIG. 10. The lens 15 is installed on a plate 44 in order to be assembled to the support 43.

The plate 44 is movably mounted on the support 43 to be moved between the active position and the retracted position of the lens 15 by drive means 22, as described above with reference to FIG. 5. The drive means 22 cause the lens 15 to be moved with the help of guide means 45 interposed between the support 43 and the plate 44.

In the embodiment shown in FIGS. 11 and 12 and as mentioned above, the drive means 22 are automatic drive means comprising at least one actuator 25 that is operated under the control of control means 26.

By way of example in FIG. 11, the lens 15 is mounted to move in translation Tr on the support 43 with the help of guide means 45 arranged as rails 46, 46' co-operating with slideways 47, 47'. In the embodiment shown, the rails 46, 46' are arranged on the support 43 and the slideways 47, 47' are arranged in the plate 44. It should naturally be understood that said rails 46, 46' and said slideways 47, 47' could be arranged equally well on the support 43 and the plate 44, respectively.

Also by way of example in FIG. 12, the lens 15 is mounted on the support 43 to be movable in pivoting P with the help of guide means 45 arranged as a stub axle providing a pivot mount between the support 43 and the plate 44.

In FIGS. 13 and 14, and as previously described with reference to FIG. 5, a lens 15 of a radioaltimeter in accordance with the present invention may be provided with adjustment means 19 for adjusting the lens and more specifically with adjustment means 19 for adjusting the effects produced by the lens on reducing the optimum field of view of the radioaltimeter.

More particularly, the lens 15 is mounted on a support 41 of the radio apparatus of the radioaltimeter. Such a support 41 is advantageously used for receiving the antennas 9, 9' of the radioaltimeter in order to enable them to be mounted on board the rotorcraft, such as for example for the support 39 shown in FIG. 10. The lens 15 is installed on a plate 42 for assembly to the support 41.

In the embodiments shown respectively in FIGS. 13 and 14, the adjustment means 19 for adjusting the lens 15 make use of at least one said actuator 25 that is operated under the control of said control means 26, as described above with reference to the description of FIG. 5.

It should be understood that said at least one actuator 25 and said control means 26 may potentially be used selectively for retracting the lens as shown in FIGS. 11 and 12, and/or for adjusting the lens 15 so as to modify the effects it produces on reducing the optimum field of view of the radioaltimeter.

In FIG. 13, the adjustment means 19 for adjusting the lens 15 comprise means for imparting relative movement between the antennas 9, 9' and the lens 15. In the embodiment shown, the lens 15 is movably mounted on the radio apparatus so as to move the plate 42 in its general plane on the support 41, parallel to the general plane of the support 41, and more particularly parallel to the general plane of the antennas 9, 9' mounted on the support 41.

For this purpose, the plate 42 is fitted with guide means 48 on the support 41, such as comprising a set of guide columns 50 interposed between the support 41 and the plate 42. The lens 15 is movable in its general plane away from, or conversely towards, the antennas 9, 9' by using drive means 49, such as the drive means 22 mentioned above with reference to FIG. 5 and FIGS. 11 and 12, that can also potentially be used for retracting the lens 15.

In this context, it should be understood that the drive means 49 are preferably the same as the drive means 22.

In FIG. 14, the adjustment means 19 for adjusting the lens 15 comprise means for modifying the optical configuration of the lens 15. More particularly, in the embodiment shown, the adjustment means 19 comprise means 55 for controlling a flow of fluid 51 inside a pouch 52 incorporated in the lens 15. The actuator 25 that is operated under the control of the control means 26 is constituted in this example by a member for controlling a valve 53 in association with a source 54 of said fluid 51.

In the diagrams (k) and (l) of FIG. 15, the lens 15 is potentially provided with a specific layer referred to as a "filter" layer 56. Since the transmit antenna 9 generates incident waves 57 going towards the lens 15, the lens 15 can reflect waves, referred to as "reflected" waves 58 back to the transmit antenna 9. Such reflected waves 58 disturb the penitence of the electromagnetic signals 57' generated by the transmit antenna 9.

In this context, the filter layer 56 gives rise to a phase shift between the reflected waves 58 so as to avoid being a source of disturbance for the electromagnetic signals generated by the transmit antenna 9.

In the embodiment shown in diagram (k), the filter layer 56 is formed by a coating 59 covering the lens 15, at least along its surface facing towards the transmit antenna 9, so as to modify the basic field of view of the radioaltimeter. Such a coating 59 is obtained in particular by using a specific material suitable for producing said phase shift between the incident waves 57.

In the embodiment shown in the diagram (l), the filter layer 56 is formed by a portion in relief 60 incorporated with the lens 15, and in particular on its surface facing towards the transmit antenna 9 so as to modify the basic field of view of the radioaltimeter. In the embodiment shown, such a portion in relief 60 is suitable for producing a phase shift between the reflected waves 58 and is shaped as a succession of projections and recesses forming respective splines leaving grooves between them.

Although the member described and shown for modifying the scope of the field of view of the radioaltimeter is constituted by a lens, the term "lens" should not be considered in the strict meaning of the term. By analogy, such a lens may be replaced by any other known member that produces the same effects on the field of view of the radioaltimeter, such as for example metal plates arranged parallel with one another and forming an artificial lens having an index of less than 1, or also for example metal patterns printed on at least one substrate having a negative index and commonly referred to as a metamaterial.

What is claimed is:

1. A method of measuring the height of a rotorcraft above the ground by means of a radioaltimeter using a computer that determines the height of the rotorcraft above the ground on the basis of data supplied by radio apparatus including at least one set of two antennas that are protected by at least one radome, the antennas being of plane configuration and being installed on the underside of the rotorcraft, as considered when the rotorcraft is standing on the ground, the antennas defining between them a "basic" field of view of the radioaltimeter and supplying the data to the computer by exchanging electromagnetic signals between the antennas, wherein the rotorcraft is also provided with sling equipment for transporting a load, and the method comprises an operation of modifying the basic field of view of the radioaltimeter by at least one lens as a function of whether or not a given load that is to be transported swinging under the rotorcraft by the sling equipment will interfere in the basic field of view of the radioaltimeter, the at least one lens being used selectively depending on whether the field of mobility of the load modifies the basic field of view of the radioaltimeter, as follows:

in the event of the sling equipment not transporting a load, then the radioaltimeter produces a field of view having a predefined optimum scope, referred to as the optimum field of view; and in the event of the sling equipment transporting a load, then the radioaltimeter produces a "limited" field of view of scope smaller than the scope of the optimum field of view, the limited field of view being identified by excluding from the optimum field of view a previously determined field of mobility of the load transported by the sling equipment and as considered at least along the longitudinally-extending axis of the rotorcraft; and wherein the basic field of view is one of the optimum field of view and the limited field of view, and wherein the lens is selectively used to produce the other of the optimum field of view and the limited field of view.

2. A method according to claim 1, wherein, the lens is formed by a converging lens, and the method comprises both:

an operation of the converging lens focusing the basic field of view of the radioaltimeter depending on the previous identified field of mobility of the load thereby causing the radioaltimeter to have the limited field of view; and an operation of neutralizing the effects produced by the converging lens on the basic field of view of the radioaltimeter thereby causing the radioaltimeter to have the optimum field of view.

3. A method according to claim 1, wherein, the lens is formed by a diverging lens, and the method comprises both:

an operation of the diverging lens enlarging the basic field of view of the radioaltimeter thereby causing the radioaltimeter to have the optimum field of view; and an operation of neutralizing the effects produced by the diverging lens on the basic field of view of the radioaltimeter thereby causing the radioaltimeter to have the limited field of view.

4. A method according to claim 1, wherein the method comprises the following operations:

identifying a field of mobility of at least one said given load, and then determining an "interference" field as identified by the intersection between the optimum field of view and the field of mobility of the given load, and then deducing the limited field of view that excludes the interference field from the optimum field of view, the interference field being considered as at least along the longitudinally-extending axis of the rotorcraft;

identifying an optical configuration of at least one lens suitable for modifying the basic field of view of the radioaltimeter:

either by using a converging lens to reduce the basic field of view of the radioaltimeter to the limited field of view in the event of the basic field of view of the radioaltimeter being equivalent to the optimum field of view;

or else, by using a diverging lens to increase the basic field of view of the radioaltimeter to the predefined optimum field of view when the basic field of view of the radioaltimeter is equivalent to the limited field of view of the radioaltimeter; and then selectively using or not using the at least one lens of previously identified optical configuration, depending on the field of view to be imparted to the radioaltimeter as selected from the optimum field of view and from the limited field of view, respectively in the absence and in the presence of a given load being transported by the sling equipment.

5. A method according to claim 4, wherein the limited field of view is deduced by excluding from the optimum field of view the interference field as considered both along the longitudinally-extending axis of the rotorcraft and along the transversely-extending axis of the rotorcraft.

6. A method according to claim 1, wherein:

a plurality of fields of mobility are identified respectively for each of a plurality of given loads, and consequently a plurality of the limited fields of view are deduced respectively for each of the previously identified plurality of fields of mobility;

a plurality of optical configurations of the at least one lens are identified depending respectively on the plurality of limited fields of view; and at least one lens of optical configuration previously identified for a load under consideration is used in order to impart to the radioaltimeter the limited field of view as deduced from the field of mobility of the load under consideration for transporting by the sling equipment.

7. A method according to claim 6, wherein the at least one lens is selected from a set of interchangeable lenses of respective optical configurations previously identified depending on the plurality of given loads.

8. A method according to claim 6, wherein the optical configuration of the at least one lens is modifiable depending on the limited field of view deduced for the radioaltimeter as a function of a load under consideration for transporting by the sling equipment.

9. A method according to claim 1, wherein the at least one lens is selectively movable between an active position in which the lens modifies the basic field of view of the radioaltimeter and a retracted position in which the lens is disengaged from the antennas and consequently has no effect on the basic field of view of the radioaltimeter.

10. A method according to claim 1, wherein:

the at least one said lens is selected from a set of interchangeable lenses of respective optical configurations;

the optical configuration of the at least one lens is modifiable depending on the limited field of view for the radioaltimeter as previously deduced depending on whether or not a said given load is to be transported by sling; and the at least one said lens is selectively movable between an active position in which the lens modifies the basic field of view of the radioaltimeter and a retracted position in which the lens is disengaged from the antennas and consequently has no effect on the basic field of view of the radioaltimeter.

11. A radioaltimeter for a rotorcraft and configurated for performing the method according to claim 1, the radioaltimeter comprising the computer for determining the height of the rotorcraft above the ground from data supplied by the radio apparatus comprising the at least one set of two antennas of plane configuration and the radome for protecting the antennas, the antennas predefining between them the "basic" field of view of the radioaltimeter and supplying data to the computer by exchanging electromagnetic signals, wherein the radio apparatus further comprises the at least one lens for modifying the basic field of view of the radioaltimeter as defined by the plane configuration antennas.

12. A radioaltimeter according to claim 11, wherein the lens is a converging lens for focusing the basic field of view of the radioaltimeter.

13. A radioaltimeter according to claim 11, wherein the lens is a diverging lens for enlarging the basic field of view of the radioaltimeter.

14. A radioaltimeter according to claim 11, wherein the lens is incorporated in the radome, then referred to as an "optical" radome.

15. A radioaltimeter according to claim 14, wherein the optical radome is made up of at least two layers comprising an outer layer of waterproof cellular material containing an inner layer forming the lens.

16. A radioaltimeter according to claim 11, wherein the antennas of the at least one lens and the radome are assembled together in a common structural assembly having means for reversibly attaching it to a structure external to the radioaltimeter.

17. A radioaltimeter according to claim 11, wherein the lens is provided with a specific layer, referred to as a "filter" layer, generating a phase shift between the waves returned towards the transmit antenna, referred to as "reflected" waves, as a result of the lens receiving electromagnetic waves, referred to as "incident" waves, coming from the radio signals transmitted by the transmit antenna.

18. A radioaltimeter according to claim 17, wherein the filter layer is provided on the outside surface of the lens, at least in its portion facing towards the transmit antenna.

19. A radioaltimeter according to claim 17, wherein the filter layer is formed at least by a coating covering the lens.

20. A radioaltimeter according to claim 17, wherein the filter layer is formed at least by a specific portion in relief incorporated in the lens.

21. A radioaltimeter according to claim 11, wherein the radioaltimeter is provided with adjustment means for adjusting the lens and suitable for modifying the effects of the lens on the basic field of view of the radioaltimeter.

22. A radioaltimeter according to claim 21, wherein the adjustment means for adjusting the lens are means for modifying the optical configuration of the lens.

23. A radioaltimeter according to claim 22, wherein the means for modifying the optical configuration of the lens are means for controlling a flow of fluid inside the lens so as to modify its optical characteristics; and
wherein the lens is formed by a plurality of plies forming between them at least one fluid flow pouch, a flow of fluid inside the at least one pouch modifying the optical configuration of the lens.

24. A radioaltimeter according to claim 21, wherein the adjustment means for adjusting the lens are means for imparting relative movement between the antennas and the lens that is movably mounted on the radio apparatus.

25. A radioaltimeter according to claim 11, wherein the radioaltimeter is fitted with retraction means for retracting the lens and suitable for moving the lens relative to the antennas, the lens being movably mounted on the radio apparatus to move between an active position in which the lens modifies the basic field of view of the radioaltimeter and a retracted position in which the lens is placed outside the basic field of view of the radioaltimeter and consequently has no effect on the basic field of view of the radioaltimeter.

26. A radioaltimeter according to claim 21, wherein the lens is movably mounted on a support of the radio apparatus and is movable by drive means forming part of any one of at least the lens adjustment means and a lens retraction means.

27. A radioaltimeter according to claim 26, wherein the drive means for driving the lens are means for enabling an operator to move the lens manually.

28. A radioaltimeter according to claim 26, wherein the drive means for driving the lens are automatic means for driving the lens comprising at least one actuator that is operated under the control of control means.

29. A radioaltimeter according to claim 28, wherein the control means may comprise equally well manual control means operable by an operator and/or automatic control means operable on receiving an "activation" setpoint from the control means, which setpoint is generated by a calculation member forming part of the radioaltimeter and identifying the effects to be produced by the lens on the basic field of view of the radioaltimeter.

30. A radioaltimeter according to claim 11, wherein the computer has a main algorithm for calculating the height of the rotorcraft above the ground on the basis of the data supplied by the radio apparatus, the computer further having an auxiliary algorithm for taking account of the effects specifically produced by the lens on the basic field of view of the radioaltimeter.

31. A rotorcraft fitted with a radioaltimeter comprising a computer for identifying the height of the rotorcraft above the ground from data supplied by a radio apparatus comprising at least one set of two antennas that co-operate by exchanging electromagnetic signals, the antennas being of plane configuration and being installed on the underside of the rotorcraft, as considered when the rotorcraft is standing on the ground, and being protected by at least one radome, the antennas defining between them a predefined "basic" field of view of the radioaltimeter, the rotorcraft being fitted with sling equipment for transporting a load swinging under the rotorcraft in a previously identified given field of mobility, wherein the radio apparatus includes at least one lens for modifying the basic field of view of the radioaltimeter at least along the longitudinally-extending axis of the rotorcraft, the lens modifying the basic field of view of the radioaltimeter as follows:
in the event of not transporting said load by the sling equipment, optimizing the field of view of the radioaltimeter by imparting it a predefined field of view referred to as the "optimum" field of view; and
in the event of transporting the load by the sling equipment, reducing the optimum field of view by imparting to the radioaltimeter a field of view referred to as a "limited" field of view, as a function of the field of mobility of the load transported swinging under the rotorcraft;
wherein the basic field of view is one of the optimum field of view and the limited field of view, and wherein the lens is selectively used to provide the other of the optimum field of view and the limited field of view.

32. A rotorcraft according to claim 31, wherein the lens is a converging lens for focusing the basic field of view of the radioaltimeter, and the surface of the lens that modifies the basic field of view of the radioaltimeter converges along the longitudinally-extending and transversely-extending axes of the rotorcraft.

33. A rotorcraft according to claim 31, wherein the lens is a converging lens for focusing the basic field of view of the radioaltimeter, and the surface of the lens that modifies the basic field of view of the radioaltimeter is convex along the longitudinally-extending axis of the rotorcraft and is essentially plane along the transversely-extending axis of the rotorcraft.

34. A rotorcraft according to claim 33, wherein the lens has rounded edges provided at the ends of the surface of the lens that modifies the basic field of view of the radioaltimeter, the rounded ends being considered along the transversely-extending axis of the rotorcraft.

35. A rotorcraft according to claim 31, wherein the lens is removably mounted on the radio apparatus and is interchangeable from among a set of lenses of respective optical configurations.

36. A rotorcraft according to claim 35, wherein the lens is removably mounted on the radio apparatus at least in part by means of means for fastening the antennas on an outside wall of the rotorcraft.

37. A rotorcraft according to claim 31, wherein the radioaltimeter is fitted with an automatic control means, and the sling equipment is fitted with detector means for detecting that the sling equipment is carrying a load, the detector means contributing information to a calculation member by generating an activation setpoint for the control means as a result of the transported load being released, thereby causing a lens retraction means to be operated to move the lens between an active position and a retracted position.

38. A rotorcraft according to claim 37, wherein the computer contributes to the calculation member by generating the activation setpoint for the control means to cause the retraction means to be operated to move the lens between the retracted position and the active position as a result of the computer detecting a height above the ground representative of transporting a load by sling on the basis of the data supplied by the radio apparatus.

39. A method of measuring the height of a rotorcraft above the ground, the rotorcraft having sling equipment for transporting a load, the method comprising:

providing a radioaltimeter with a radio apparatus having a set of two antennas protected by a radome, the antennas installed on an underside of the rotorcraft as considered when the rotorcraft is standing on the ground, the antennas defining between them a basic field of view, the basic field of view being one of a first field of view and a second field of view, the second field of view being smaller in scope than the first field of view;

determining if a given load that is to be transported swinging under the rotorcraft by the sling equipment will interfere in the first field of view of the radioaltimeter;

identifying the second field of view by excluding from the first field of view a previously determined field of mobility of the load transported by the sling equipment as considered at least along a longitudinally-extending axis of the rotorcraft;

selectively modifying the basic field of view of the radioaltimeter by inserting a lens such that the other of the first field of view and the second field of view are produced;

producing the first field of view using the radioaltimeter in the event of the sling equipment not transporting the given load;

producing the second field of view using the radioaltimeter in the event of the sling equipment transporting a load;

supplying data to a computer by exchanging electromagnetic signals between the antennas; and determining a height of the rotorcraft above the ground on the basis of the data provided by the computer.

* * * * *